(12) United States Patent
Tsai et al.

(10) Patent No.: US 12,153,474 B2
(45) Date of Patent: Nov. 26, 2024

(54) ELECTRONIC DEVICE

(71) Applicants: I-Ta Tsai, Taipei (TW); Jyh-Chyang Tzou, Taipei (TW); Hsin Yeh, Taipei (TW); I-Hao Chen, Taipei (TW)

(72) Inventors: I-Ta Tsai, Taipei (TW); Jyh-Chyang Tzou, Taipei (TW); Hsin Yeh, Taipei (TW); I-Hao Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 213 days.

(21) Appl. No.: 17/841,606

(22) Filed: Jun. 15, 2022

(65) Prior Publication Data
US 2023/0100165 A1 Mar. 30, 2023

Related U.S. Application Data

(60) Provisional application No. 63/249,036, filed on Sep. 28, 2021.

(51) Int. Cl.
*G06F 1/16* (2006.01)

(52) U.S. Cl.
CPC .......... *G06F 1/1681* (2013.01); *G06F 1/1616* (2013.01); *G06F 1/1679* (2013.01);
(Continued)

(58) Field of Classification Search
CPC ...... G06F 1/1681; G06F 1/1679; G06F 1/166; G06F 1/1616; G06F 1/1686; G06F 1/1624; G06F 1/1643; G06F 1/165; G06F 1/1688
See application file for complete search history.

(56) References Cited

U.S. PATENT DOCUMENTS 6,182,330 B1* 2/2001 Novin .................. G06F 1/1616
16/334
6,353,529 B1* 3/2002 Cies ..................... G06F 1/1656
361/679.05
(Continued)

FOREIGN PATENT DOCUMENTS

CN 1794132 6/2006
EP 1672463 A2 * 6/2006 .......... G06F 1/1616
(Continued)

OTHER PUBLICATIONS

"Office Action of Taiwan Counterpart Application", issued on Aug. 29, 2023, p. 1-p. 7.

*Primary Examiner* — Nidhi Thaker
(74) *Attorney, Agent, or Firm* — JCIPRNET

(57) ABSTRACT

An electronic device includes a first body, a second body and a third body. The first body includes a processing unit. The second body includes an input unit and is pivoted to an end of the first body. The third body includes a display unit and is pivoted to another end of the first body. When the third body is closed to the first body and the first body is closed to the second body, the electronic device is in a folded state. When the first body is expanded from the second body with a first predetermined angle, the third body is expanded from the first body with a second predetermined angle, such that the electronic device is in an operation state. When the electronic device is in the operation state, the third body is supported away from the second body by the first body.

15 Claims, 38 Drawing Sheets

(52) U.S. Cl.
CPC .......... *G06F 1/1624* (2013.01); *G06F 1/1643* (2013.01); *G06F 1/165* (2013.01); *G06F 1/166* (2013.01); *G06F 1/1686* (2013.01); *G06F 1/1688* (2013.01)

(56) References Cited

U.S. PATENT DOCUMENTS

| | | | | |
|---|---|---|---|---|
| 6,392,871 | B1* | 5/2002 | Yanase | G06F 1/165 |
| | | | | 345/905 |
| 7,502,221 | B2* | 3/2009 | Fuller | G06F 1/1626 |
| | | | | 361/679.04 |
| 9,441,714 | B2* | 9/2016 | Hsu | F16H 21/44 |
| 9,715,251 | B2* | 7/2017 | Chung | G06F 1/162 |
| 2004/0246665 | A1* | 12/2004 | Cheng | G06F 1/1616 |
| | | | | 361/679.06 |
| 2011/0194238 | A1* | 8/2011 | Song | G06F 1/1681 |
| | | | | 361/679.08 |
| 2011/0216483 | A1* | 9/2011 | Vesely | G06F 1/1624 |
| | | | | 361/679.01 |
| 2013/0021723 | A1* | 1/2013 | Harper | F16M 11/10 |
| | | | | 361/679.01 |
| 2014/0063712 | A1* | 3/2014 | Chung | G06F 1/1615 |
| | | | | 361/679.09 |
| 2014/0321038 | A1* | 10/2014 | Park | G06F 1/1681 |
| | | | | 361/679.09 |
| 2018/0188775 | A1* | 7/2018 | Perelli | G06F 1/1679 |
| 2018/0188781 | A1* | 7/2018 | Park, Jr. | G06F 1/1679 |
| 2019/0258300 | A1* | 8/2019 | Gerardi | G06F 1/1686 |
| 2019/0361497 | A1* | 11/2019 | Yang | G06F 1/1681 |
| 2024/0111330 | A1* | 4/2024 | Yu | G06F 1/1683 |

FOREIGN PATENT DOCUMENTS

| | | |
|---|---|---|
| TW | 201320742 | 5/2013 |
| TW | 201525661 | 7/2015 |

\* cited by examiner

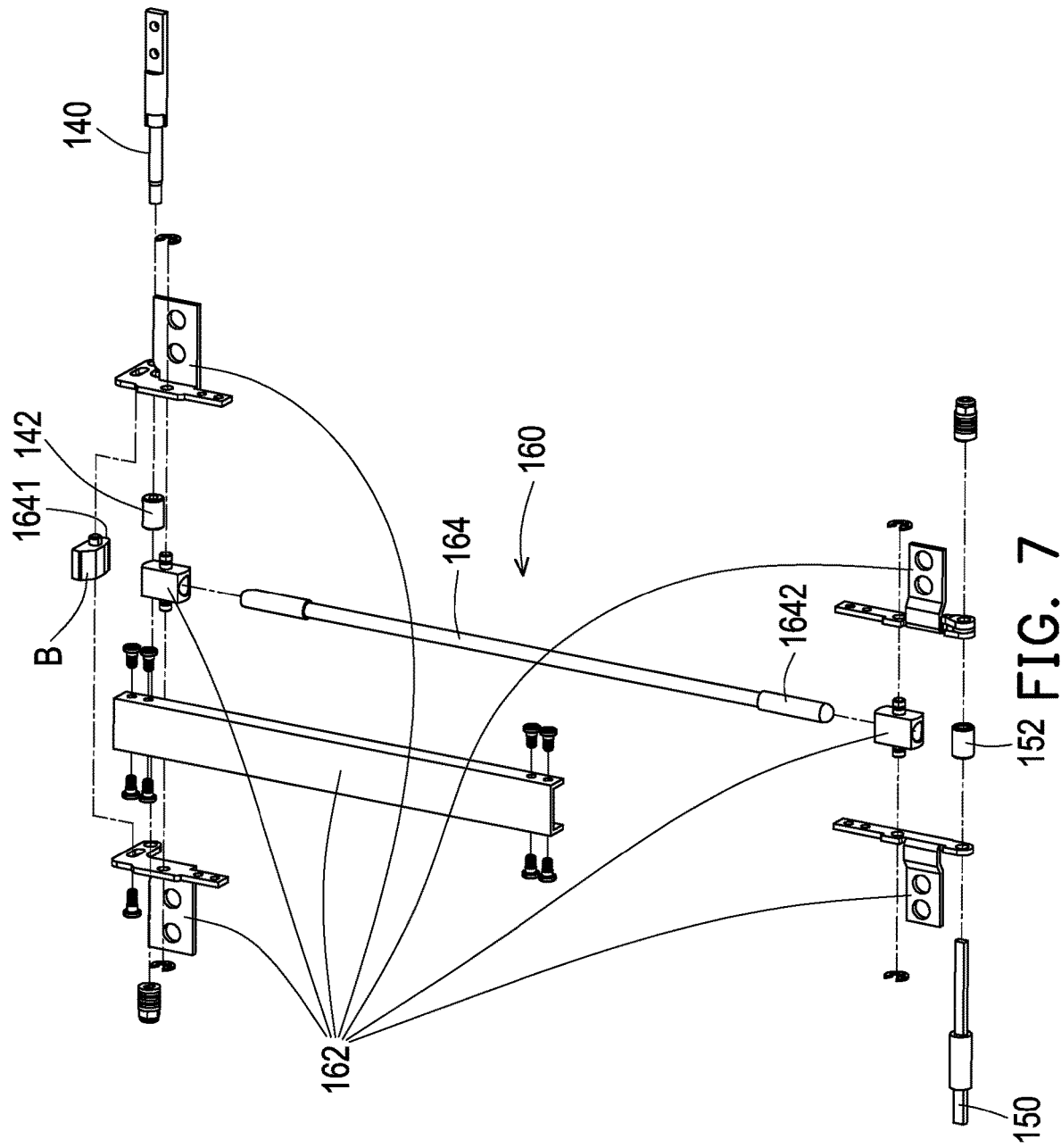

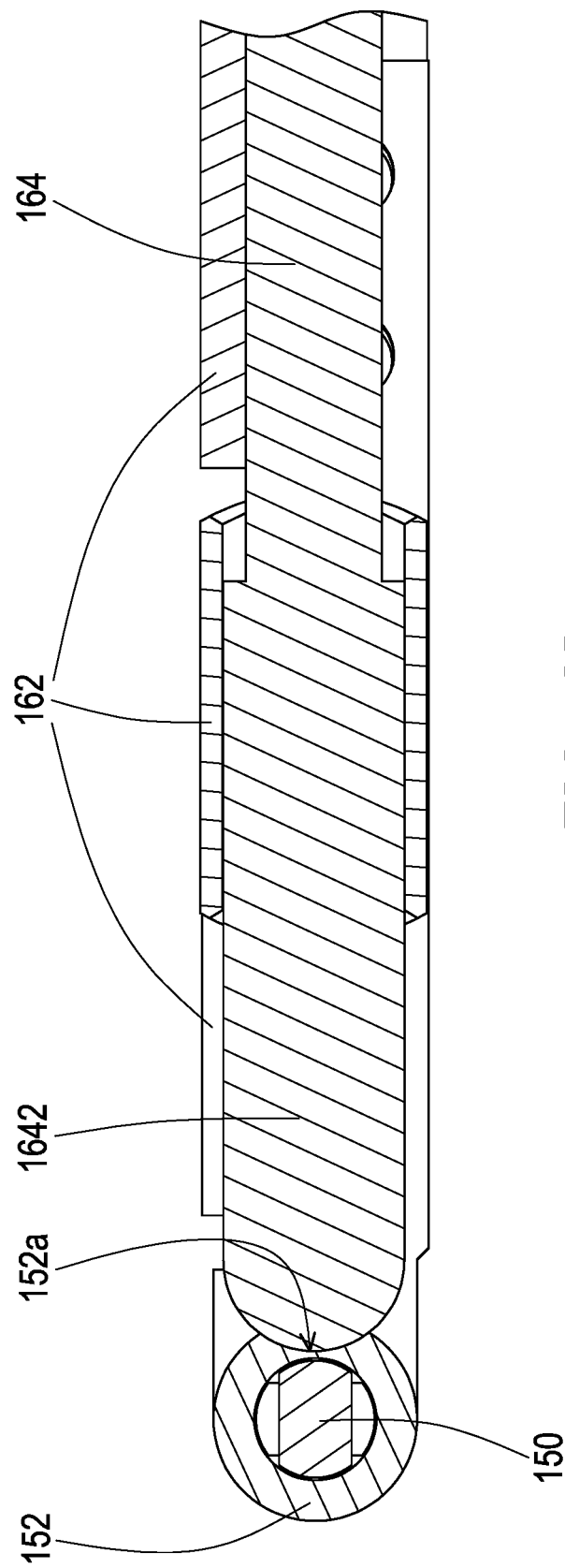

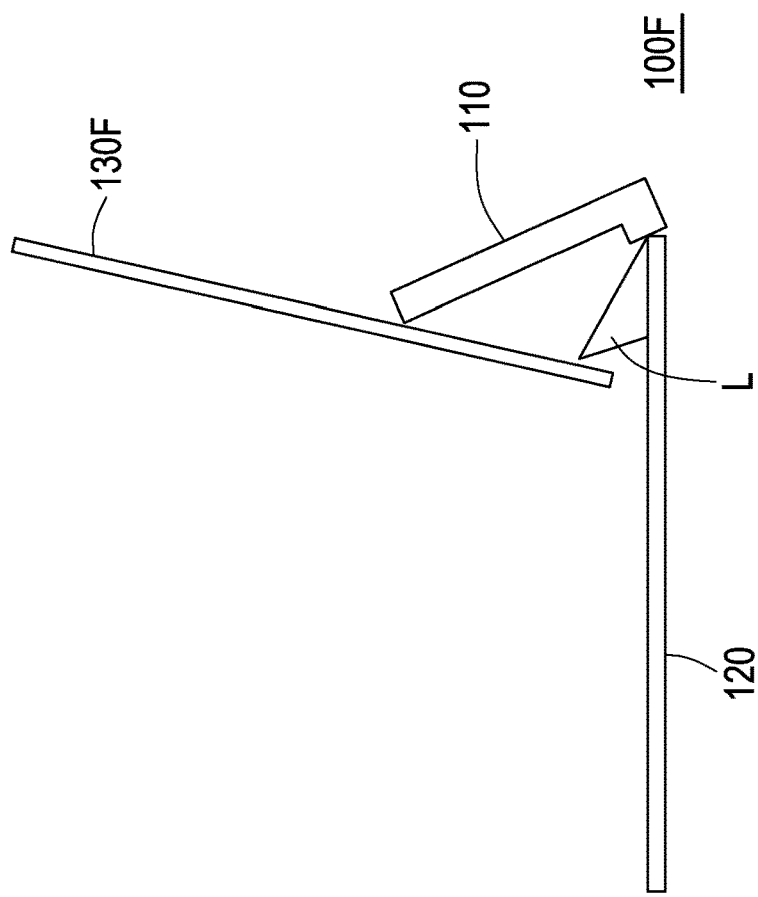
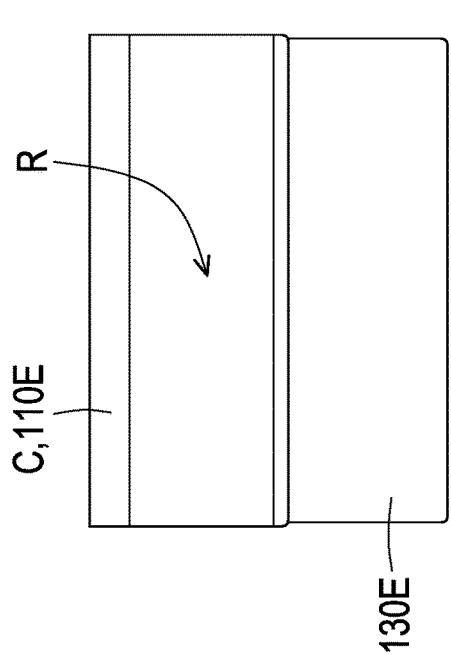

ELECTRONIC DEVICE

CROSS-REFERENCE TO RELATED APPLICATION

This application claims the priority benefit of US provisional application Ser. No. 63/249,036, filed on Sep. 28, 2021. The entirety of each of the above-mentioned patent applications is hereby incorporated by reference herein and made a part of this specification.

BACKGROUND

Technical Field

The disclosure relates to an electronic device, and in particular relates to an electronic device including multiple bodies.

Description of Related Art

The screen of a notebook computer is mostly directly connected to a host, so when the screen is unfolded, the user is unable to experience the visual experience that the display screen exists independently in space due to the display region of the screen being too close to the host. In addition, most of the hosts of notebook computers include heat-generating elements such as processors and graphics cards. When using a notebook computer, the host is generally placed flat on a desktop surface with the bottom surface of the host facing the desktop surface, resulting in the inability of the host to dissipate heat efficiently. In addition to the above-mentioned heat-generating elements, the host of a general notebook computer also has functional assemblies such as a keyboard module and a battery module, such that the host has a large thickness, so that when using a notebook computer, the user is unable to experience the sense of thinness and lightness of the notebook computer from the host closest to the user. In addition, the battery is likely to heat up due to the influence of the heat-generating element, resulting in a reduction in the battery life.

SUMMARY

The disclosure provides an electronic device, which has better heat dissipation efficiency and battery life, and provides a better operation experience to the user. In the electronic device of the disclosure, a display screen has a high height and is close to the user, thereby providing the technical effect of a better viewing angle. In the electronic device of the disclosure, a speaker faces the user, thereby providing the technical effect of better sound playback.

An electronic device of the disclosure includes a first body, a second body and a third body. The first body includes a processing unit. The second body includes an input unit and is pivoted to an end of the first body, and a thickness of the first body is greater than a thickness of the second body. The third body includes a display unit and is pivoted to another end of the first body. When the third body is closed to the first body and the first body is closed to the second body, the electronic device is in a folded state. When the first body is expanded from the second body with a first predetermined angle, the third body is adapted to be expanded from the first body with a second predetermined angle, such that the electronic device is in an operation state. When the electronic device is in the operation state, the third body is supported away from the second body by the first body.

In an embodiment of the disclosure, when an expanded angle of the first body relative to the second body is less than the first predetermined angle, an expanded angle of the third body relative to the first body is locked to 0 degrees.

In an embodiment of the disclosure, when the third body is expanded from the first body, an expanded angle of the first body relative to the second body is locked to the first predetermined angle.

In an embodiment of the disclosure, the first predetermined angle is less than or equal to 90 degrees.

In an embodiment of the disclosure, the first predetermined angle is greater than 45 degrees and less than 85 degrees.

In an embodiment of the disclosure, the second predetermined angle is less than or equal to 135 degrees.

In an embodiment of the disclosure, the second predetermined angle is greater than 50 degrees and less than 90 degrees.

In an embodiment of the disclosure, when an expanded angle of the third body relative to the first body is between 0 degrees and a third predetermined angle, there is a first torsion force between the third body and the first body. When the expanded angle of the third body relative to the first body is between the third predetermined angle and the second predetermined angle, there is a second torsion force between the third body and the first body, and the second torsion force is greater than the first torsion force.

In an embodiment of the disclosure, the electronic device includes a first pivot shaft, a second pivot shaft, and a locking structure, in which the first body and the second body are pivotally connected to each other through the first pivot shaft, the first body and the third body are pivotally connected to each other through the second pivot shaft, and the locking structure is disposed on the first body and is adapted to lock the first pivot shaft or the second pivot shaft.

In an embodiment of the disclosure, the first pivot shaft has a first concave portion, the second pivot shaft has a second concave portion, and the locking structure includes a frame body and a locking member. The locking member is slidably disposed on the frame body and has a first locking end and a second locking end opposite to each other. When an expanded angle of the first body relative to the second body is less than the first predetermined angle, the first concave portion is misaligned with the first locking end, the second concave portion is aligned with the second locking end, and the second locking end is locked in the second concave portion. When the expanded angle of the first body relative to the second body is the first predetermined angle, the first concave portion is aligned with the first locking end, the locking member is adapted to slide relative to the frame body to lock the first locking end in the first concave portion and move the second locking end away from the second concave portion.

In an embodiment of the disclosure, the electronic device includes a first pivot shaft and a locking structure, in which the first body and the second body are pivotally connected to each other through the first pivot shaft, and the locking structure is disposed on the first body and is adapted to lock the first pivot shaft or the third body.

In an embodiment of the disclosure, the first pivot shaft has a concave portion, the third body has a first magnetic portion, the locking structure includes a connecting rod assembly, and the connecting rod assembly has a second magnetic portion and a locking end. When the connecting rod assembly is in a first state, a magnetic attraction between the first magnetic portion and the second magnetic portion closes the third body to the first body, and the connecting rod assembly is adapted to actuate from the first state to a second state, such that the locking end is locked in the concave portion.

In an embodiment of the disclosure, the locking structure further includes an elastic member, the elastic member is connected between the connecting rod assembly and the first body, and the connecting rod assembly is adapted to actuate from the first state to the second state through an elastic force of the elastic member.

In an embodiment of the disclosure, the first pivot shaft has a concave portion, the third body has a first magnetic portion, the locking structure includes a locking member, the locking member has a second magnetic portion and a locking end, and the first body has a third magnetic portion. When the locking member is in a first state, a magnetic attraction between the first magnetic portion and the second magnetic portion closes the third body to the first body. When the third body is expanded from the first body and moves the first magnetic portion away from the second magnetic portion, the locking member is actuated from the first state to a second state through a magnetic attraction between the second magnetic portion and the third magnetic portion to drive the locking end such that the locking end is locked in the concave portion.

In an embodiment of the disclosure, the magnetic attraction between the first magnetic portion and the second magnetic portion is greater than the magnetic attraction between the second magnetic portion and the third magnetic portion.

In an embodiment of the disclosure, the electronic device further includes an image capturing assembly, the image capturing assembly is movably disposed on a rear side of the third body. When the electronic device is in the operation state, the image capturing assembly is adapted to protrude from the rear side of the third body to a bottom of the third body.

In an embodiment of the disclosure, the processing unit includes at least one heat-generating element and at least one heat dissipation assembly, in which the at least one heat-generating element and the at least one heat dissipation assembly are disposed on the first body.

In an embodiment of the disclosure, the electronic device further includes at least one speaker assembly, in which the at least one speaker assembly is disposed on the first body and faces the third body.

In an embodiment of the disclosure, the input unit includes a keyboard assembly, the electronic device includes at least one battery assembly, and the keyboard assembly and the at least one battery assembly are disposed on the second body.

In an embodiment of the disclosure, the first body includes a main body and a cover body, the cover body detachably covers an inner space of the main body, when the electronic device is in the folded state, the cover body is located on a lateral side of the electronic device.

In an embodiment of the disclosure, the cover body has a transparent region, and the transparent region corresponds to the inner space.

In an embodiment of the disclosure, the transparent region has a display function.

Based on the above, in the electronic device of the disclosure, the third body is supported away from the second body by the first body in the operation state, so that the display region of the third body is not too close to the second body, thereby the user may experience the visual experience that the display screen of the third body exists independently in space. In addition, the heat-generating elements such as processors and graphic cards and the corresponding heat dissipation assemblies may be disposed on the first body with a large thickness. The first body is unfolded and is upright relative to the second body in the operation state, so that the heat dissipation air flows with a rather good flow efficiency on the front surface and the back surface of the first body, which improves its heat dissipation capacity. In addition, when using the electronic device, the user may be able to experience the sense of thinness and lightness of the electronic device through the thin thickness of the second body closest to the user. In addition, since the heat-generating element is not disposed on the second body, the battery assembly disposed on the second body does not heat up due to the influence of the heat-generating element, thereby the battery assembly may have a longer battery life.

BRIEF DESCRIPTION OF THE DRAWING

FIG. 7 is an exploded view of the first pivot shaft, the second pivot shaft, and the locking structure of FIG. 6.

FIG. 8D is a cross-sectional view of the second pivot shaft and the locking structure of FIG. 8C.

FIG. 17B to FIG. 17I illustrate changes in the shape, size and position of the transparent region of FIG. 17A.

FIG. 18 is a side schematic view of an electronic device according to another embodiment of the disclosure.

DETAILED DESCRIPTION OF DISCLOSED EMBODIMENTS

Figure 1A:
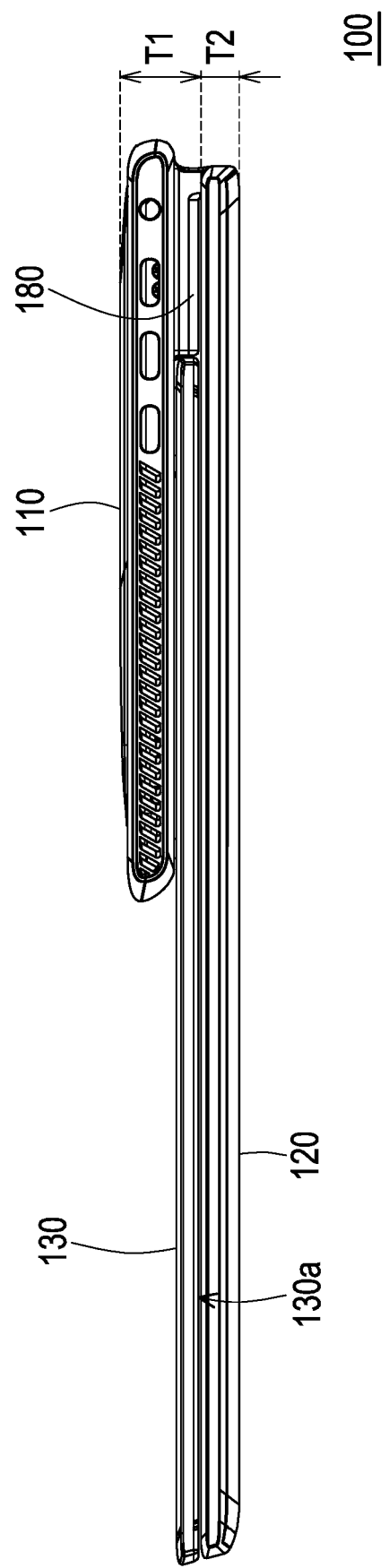
FIG. 1A to FIG. 1C are side views of various states of an electronic device according to an embodiment of the disclosure.
Figure 1B:
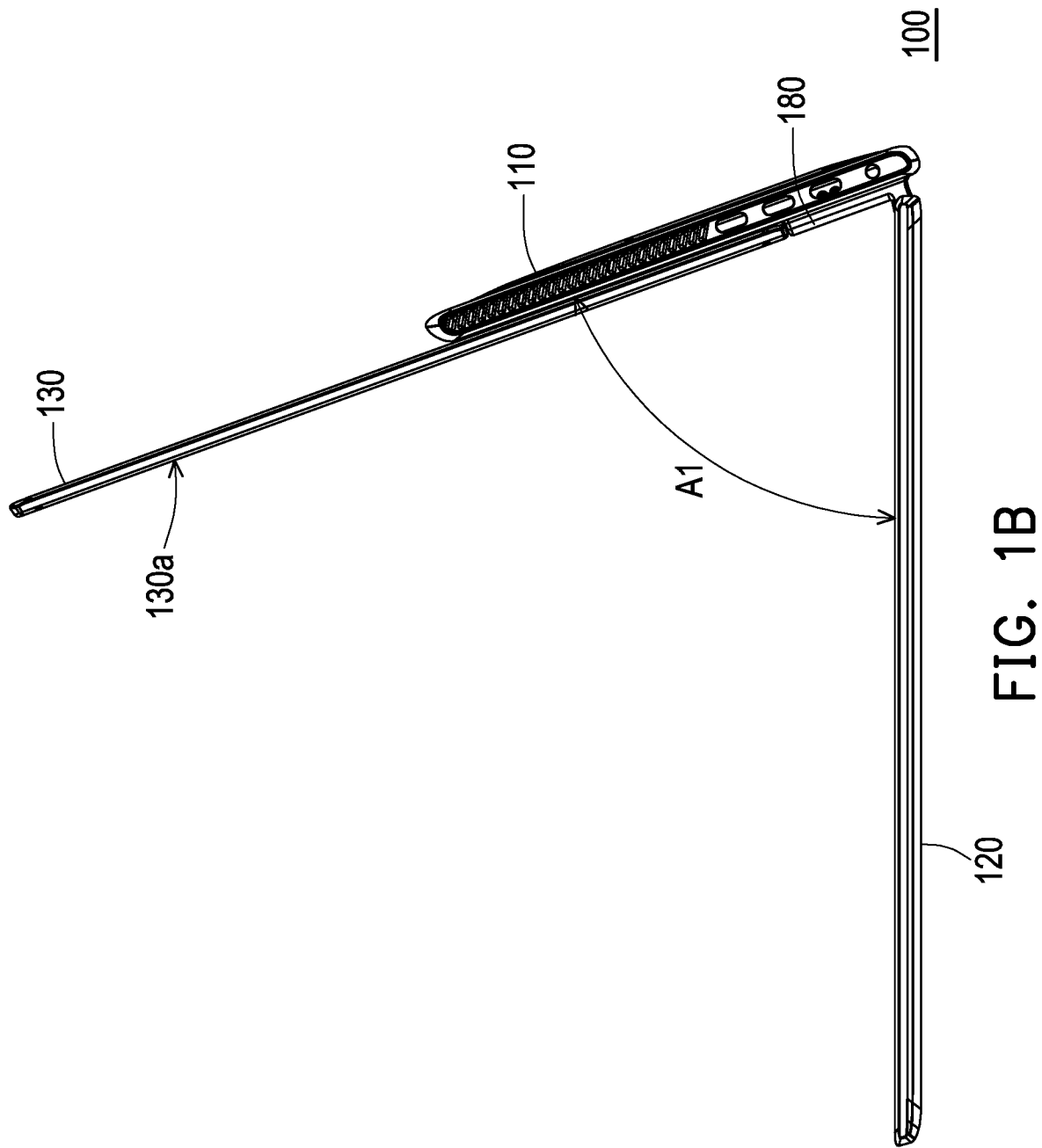
Figure 1C:
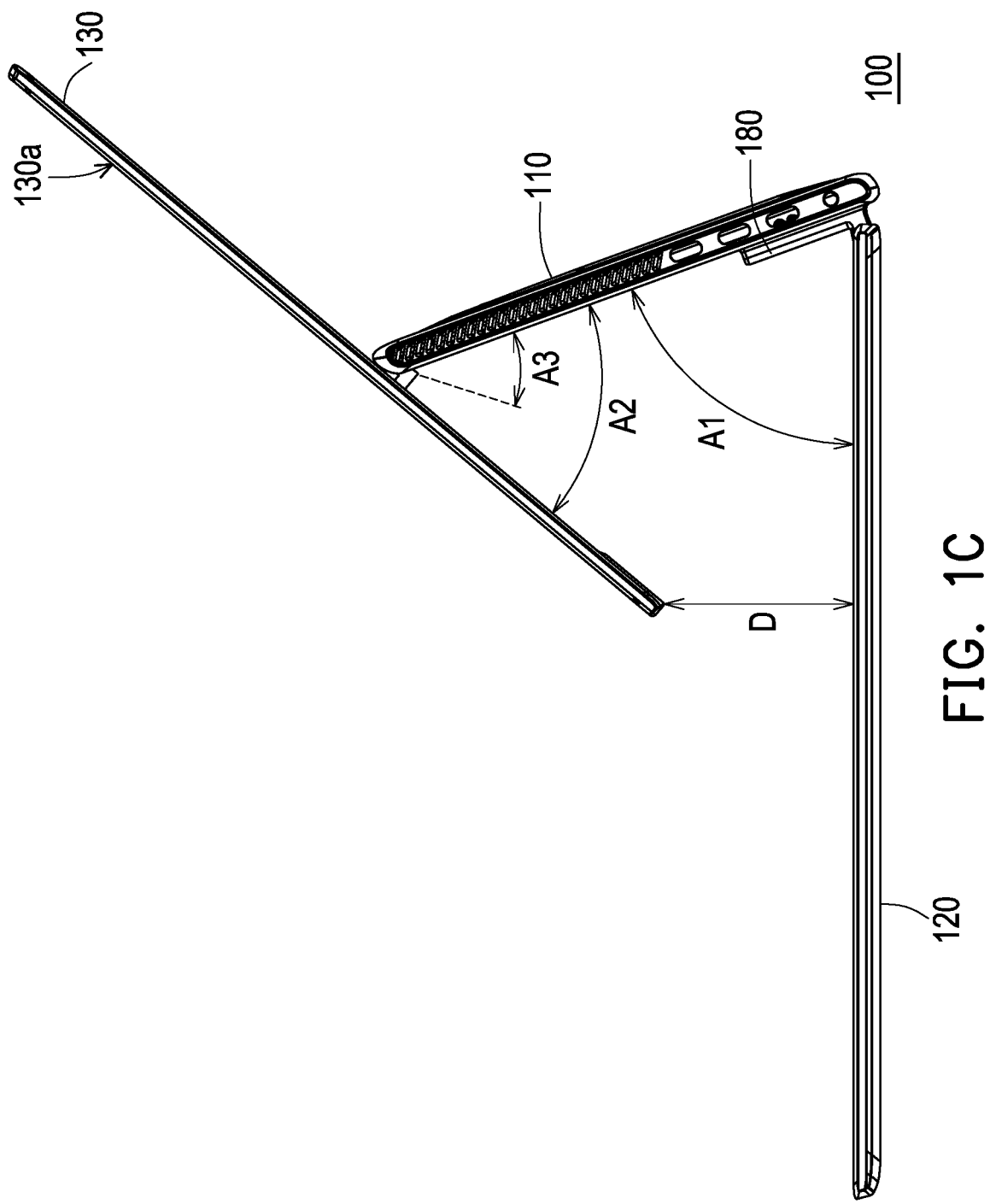
Figure 2A:
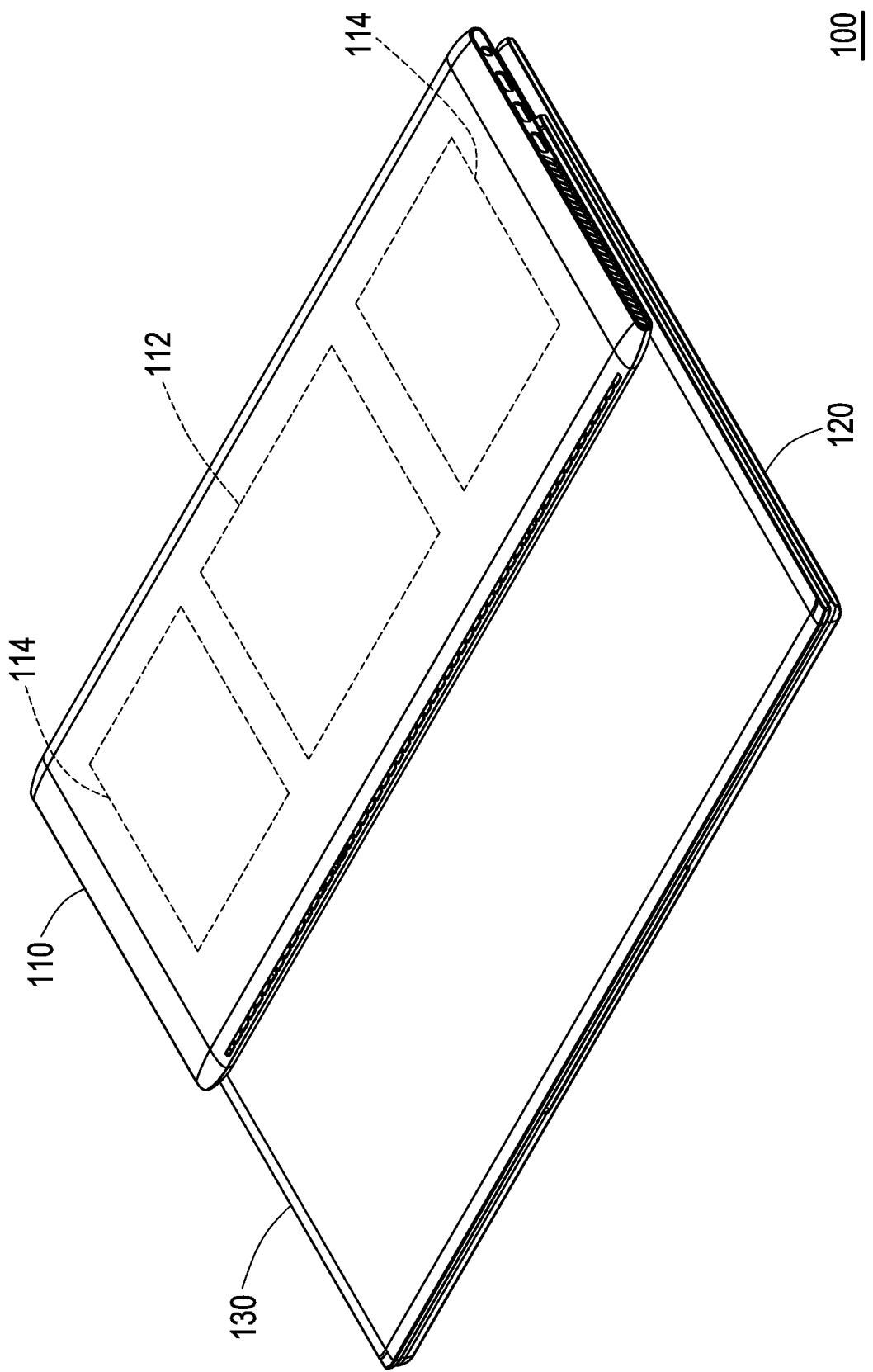
FIG. 2A to FIG. 2C are three-dimensional views of the electronic device of FIG. 1A to FIG. 1C, respectively.
Figure 2B:
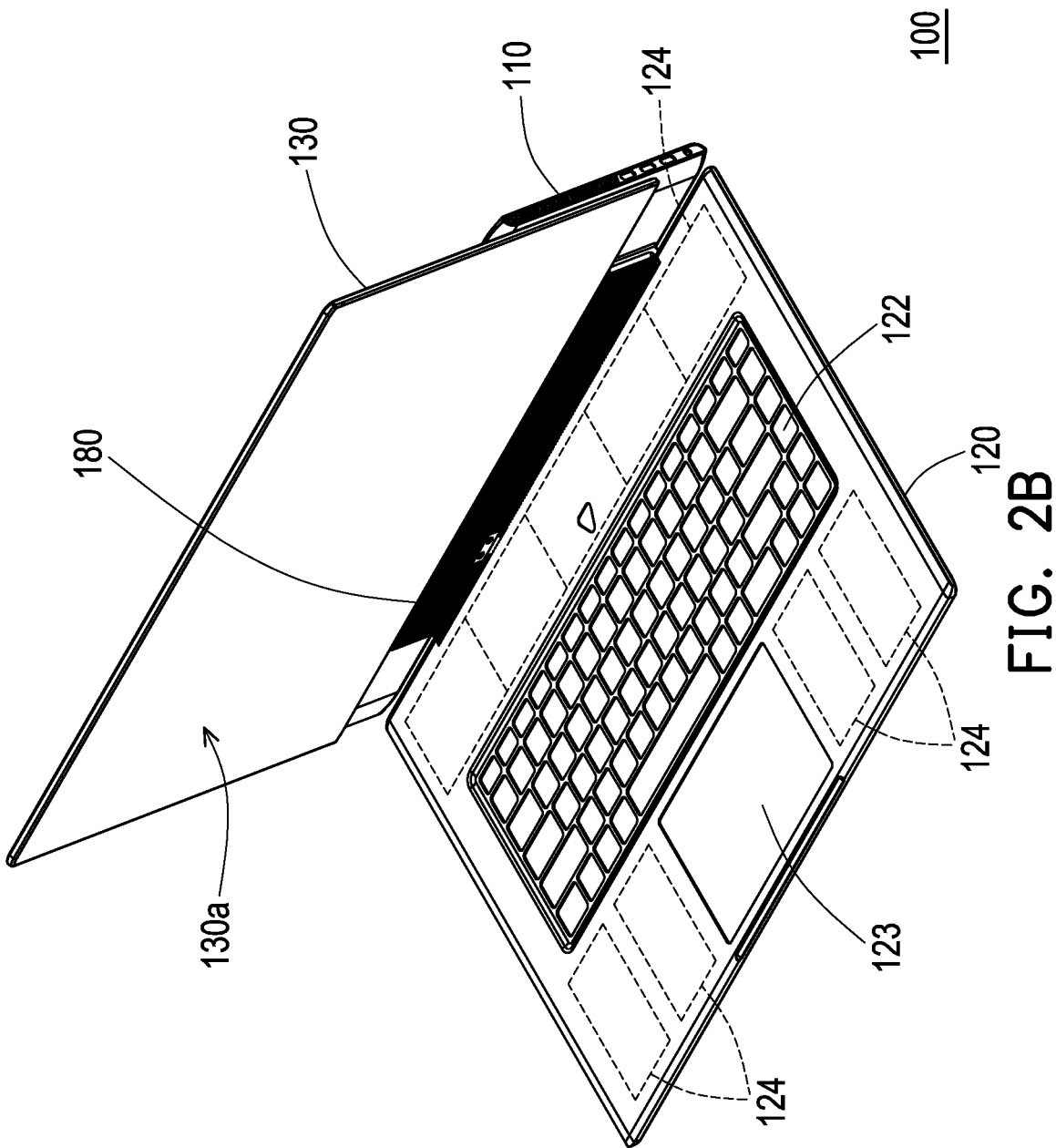
Figure 2C:
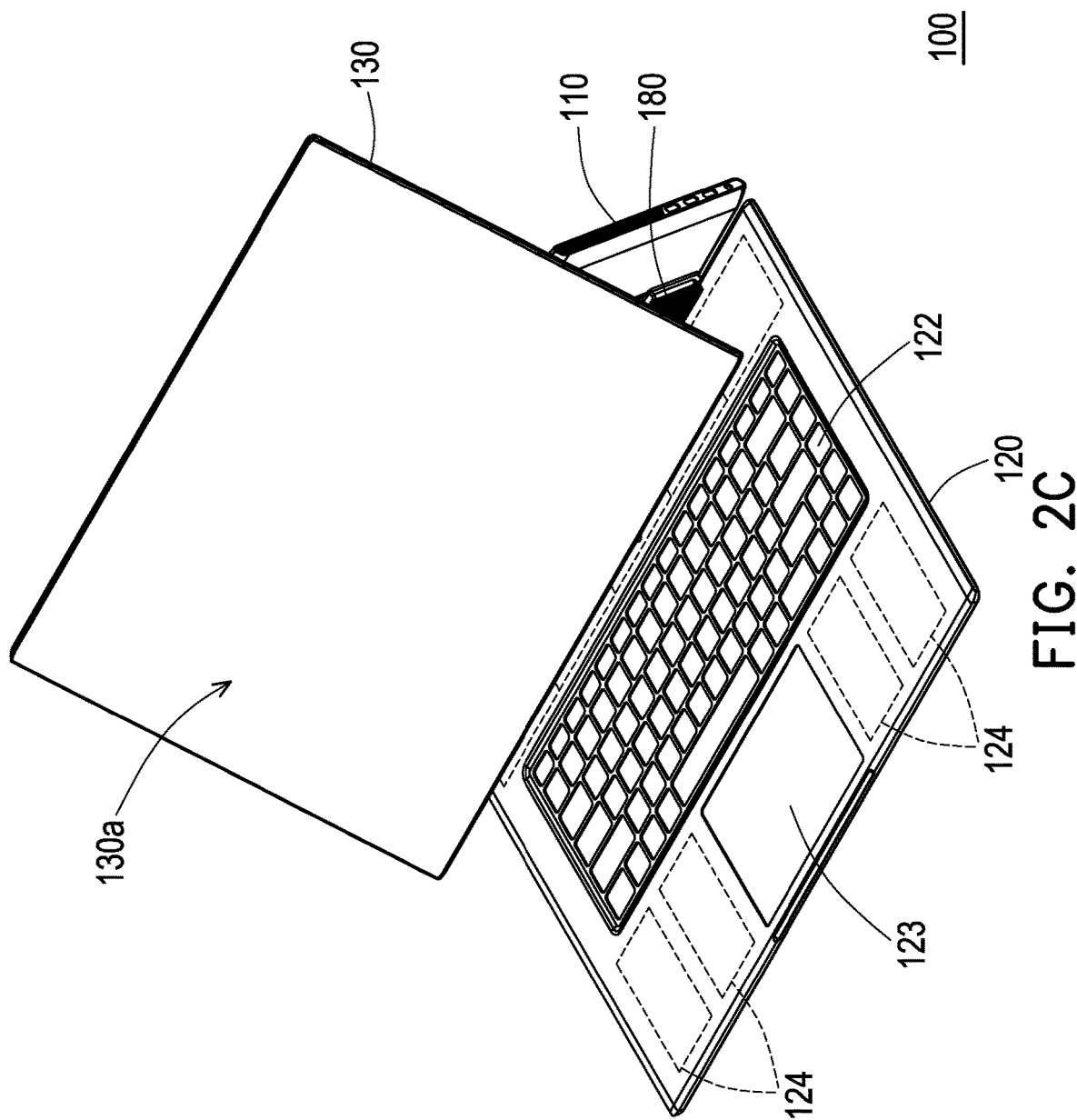
Figure 3:
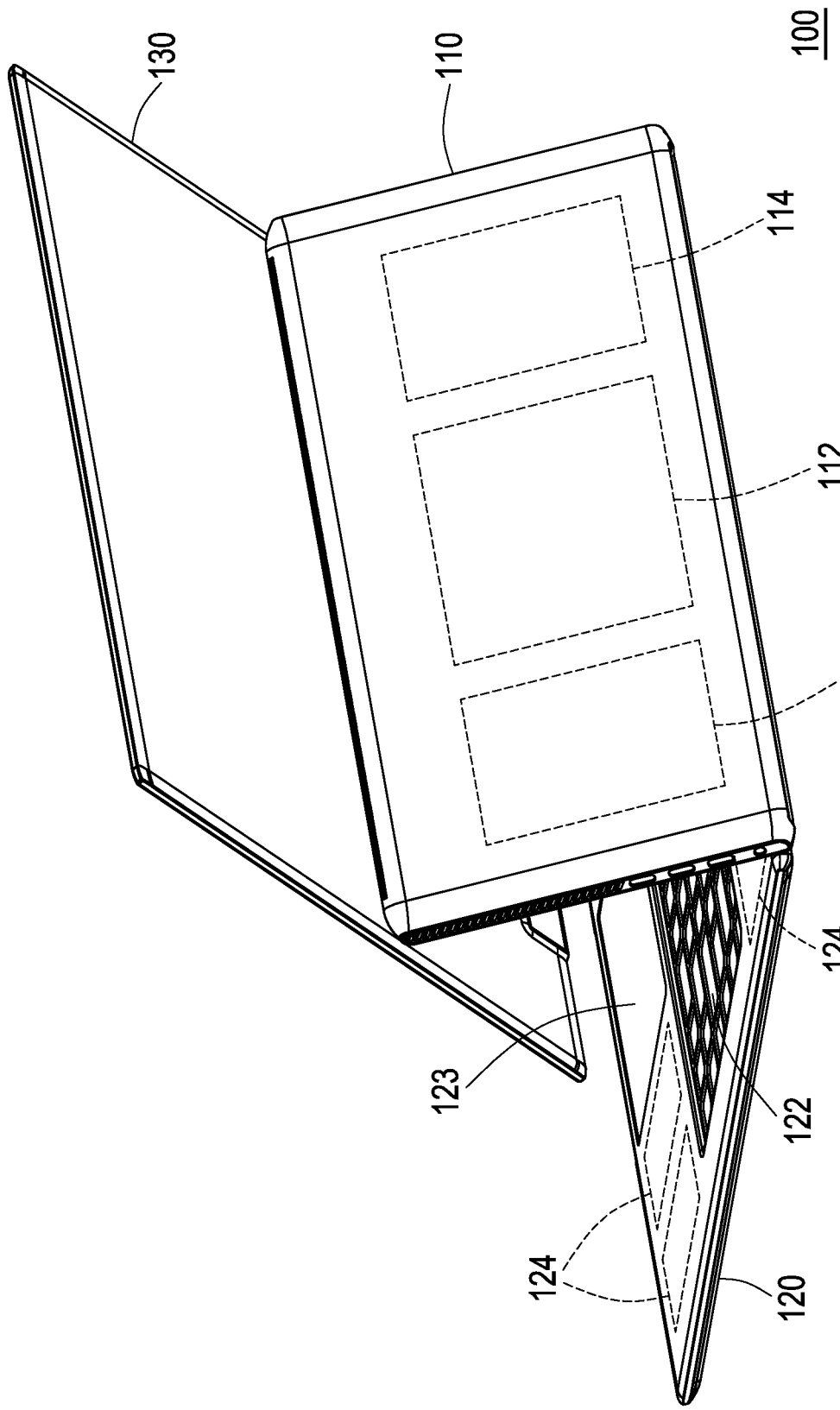
FIG. 3 is a three-dimensional view of the electronic device of FIG. 1C from another viewing angle.

FIG. 1A to FIG. 1C are side views of various states of an electronic device according to an embodiment of the disclosure. FIG. 2A to FIG. 2C are three-dimensional views of the electronic device of FIG. 1A to FIG. 1C, respectively. FIG. 3 is a three-dimensional view of the electronic device of FIG. 1C from another viewing angle. Referring to FIG. 1A to FIG. 3, an electronic device 100 of this embodiment includes a first body 110, a second body 120, and a third body 130. The second body 120 is pivotally connected to one end of the first body 110. The first body 110 is, for example, the host of the electronic device 100 and may be configured to include a processing unit, including but not limited to a heat-generating element 112 such as a processor and a graphics card, and a heat dissipation assembly 114 such as a cooling fan and a heat dissipation fin. The second body 120 may be configured to include an input unit, including but not limited to a keyboard assembly 122, a touch panel (FIG. 2B), and a battery assembly 124. A thickness T1 of the first body 110 (marked in FIG. 1A) is greater than a thickness T2 (marked in FIG. 1A) of the second body 120. The third body 130 is pivotally connected to the other end of the first body 110. The third body 130 may include but not limited to a display unit, such as a screen of the electronic device 100, or multiple screens, or a flexible screen. The third body may further include a speaker, a fill light, a camera, and other elements.

When the third body 130 is closed to the first body 110 and the first body 110 is closed to the second body 120, the electronic device 100 is in a folded state as shown in FIG. 1A. When the first body 110 is expanded from the second body 120 with a first predetermined angle A1 as shown in FIG. 1A to FIG. 1B, the third body 130 is adapted to be expanded from the first body 110 with a second predetermined angle A2 as shown in FIG. 1B to FIG. 1C, such that the electronic device 100 is in an operation state. When the electronic device 100 is in the operation state shown in FIG. 1C, the third body 130 is supported away from the second body 120 by the first body 110, so that a distance D between the third body 130 and the second body 120 (marked in FIG. 1C) is not 0.

As described above, the third body 130 is supported away from the second body 120 by the first body 110 in the operation state, so that a display region 130a of the third body 130 is not too close to the second body 120, thereby the user may experience the visual experience that the display screen of the third body 130 exists independently in space. In addition, the heat-generating element 112 and the corresponding heat dissipation assembly 114 may be disposed on the first body 110 with a large thickness as described above, and the first body 110 is unfolded and is upright relative to the second body 120 in the operation state, so that the heat dissipation air flows with a rather good flow efficiency on the front surface and the back surface of the first body, which improves its heat dissipation capacity. In addition, when using the electronic device 100, the user may be able to experience the sense of thinness and lightness of the electronic device 100 through the thin thickness of the second body 120 closest to the user. In addition, since the heat-generating element 112 is not disposed on the second body 120, the battery assembly 124 disposed on the second body 120 does not heat up due to the influence of the heat-generating element 112, thereby the battery assembly 124 may have a longer battery life.

Figure 4:
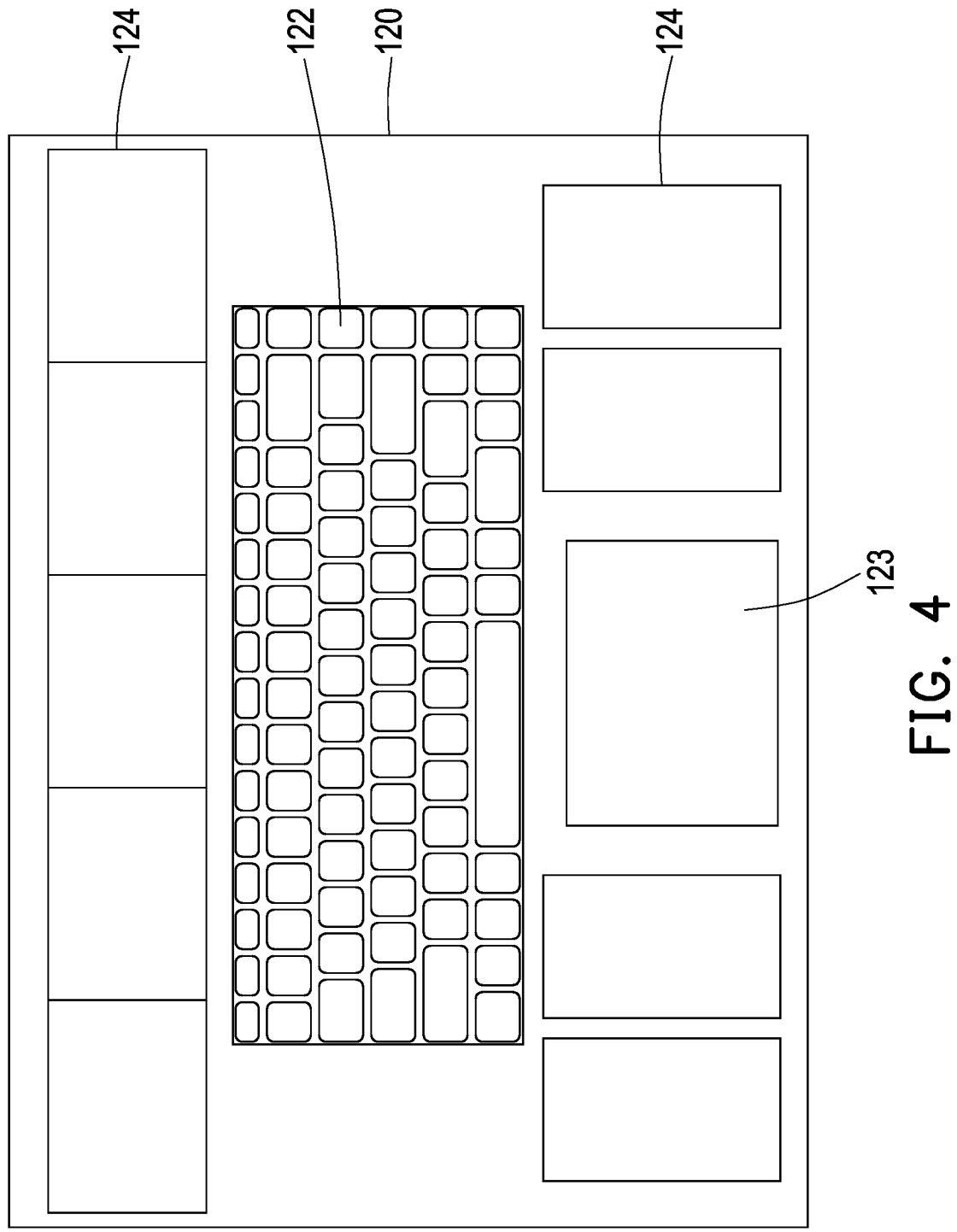
FIG. 4 is a top schematic view of the second body of FIG. 1A.

FIG. 4 is a top schematic view of the second body of FIG. 1A. Referring to FIG. 4, the battery assembly 124 of this embodiment may avoid the keyboard assembly 122 and a touch panel 123 and are evenly distributed on the second body 120 as shown in FIG. 4. In this way, the thickness of the second body 120 may be prevented from being increased from overlapping the battery assembly 124 on the keyboard assembly 122 and the touch panel 123, and even if the battery assembly 124 is deformed, the touch panel 123 is not affected. In addition, since each of the battery assemblies 124 does not overlap with other assemblies, it is convenient to directly disassemble and maintain the battery assembly 124 from above the second body 120. In other embodiments, the battery assembly 124 may be disposed in the first body 110 or the third body 130, which is not limited in the disclosure.

Further, in this disclosure, when an expanded angle of the third body 130 relative to the first body 110 is between 0 degrees and a third predetermined angle A3 (marked in FIG. 1C), there is a first torsion force between the third body 130 and the first body 110. When an expanded angle of the third body 130 relative to the first body 110 is between the third predetermined angle A3 and the second predetermined angle A2, there is a second torsion force between the third body 130 and the first body 110, and the second torsion force is greater than the first torsion force. In this way, when the user closes the third body 130 to the first body 110, the torsion force between the third body 130 and the first body 110 changes from the greater second torsion force to the smaller first torsion force. Therefore, the third body 130 may be easily closed to the first body 110 by the force of the user.

In addition, in this embodiment, when the expanded angle of the first body 110 relative to the second body 120 is less than the first predetermined angle A1 shown in FIG. 1A, the expanded angle of the third body 130 relative to the first body 110 is locked to 0 degrees. In this way, the user may prevent the user from flipping the third body 130 when the expanded angle of the first body 110 is insufficient, which causes the third body 130 to hit the second body 120. Moreover, when the third body 130 is expanded from the first body 110 as shown in FIG. 1C, the expanded angle of the first body 110 relative to the second body 120 is locked to the first predetermined angle A1. In this way, the first body 110 may be prevented from being closed to the second body 120 unexpectedly in the operation state.

In this embodiment, the first predetermined angle A1 is, for example, less than or equal to 90 degrees, preferably greater than 45 degrees and less than 85 degrees. In addition, the second predetermined angle A2 is, for example, less than or equal to 135 degrees, preferably greater than 50 degrees and less than 90 degrees.

Figure 5A:
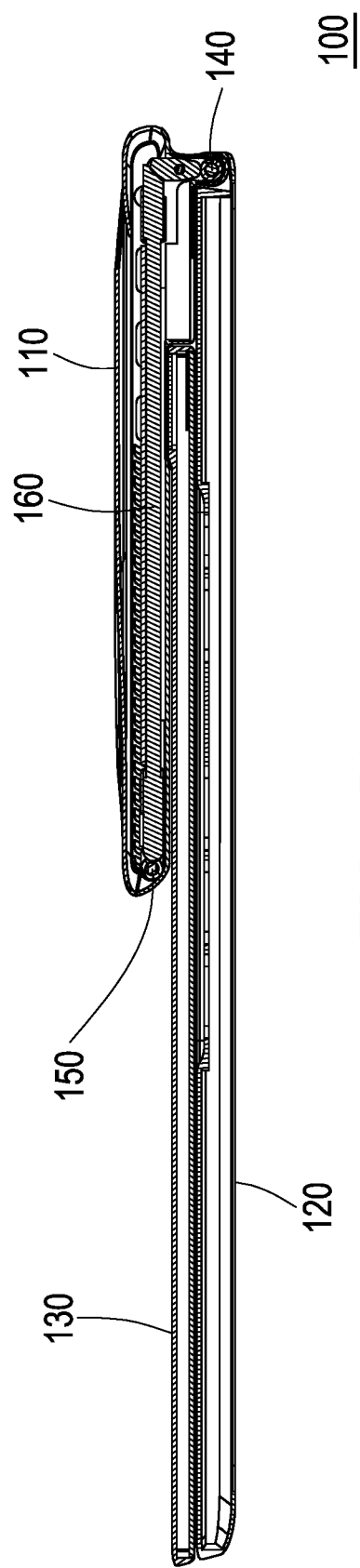
FIG. 5A to FIG. 5C are cross-sectional views of the electronic device of FIG. 1A to FIG. 1C, respectively.
Figure 5B:
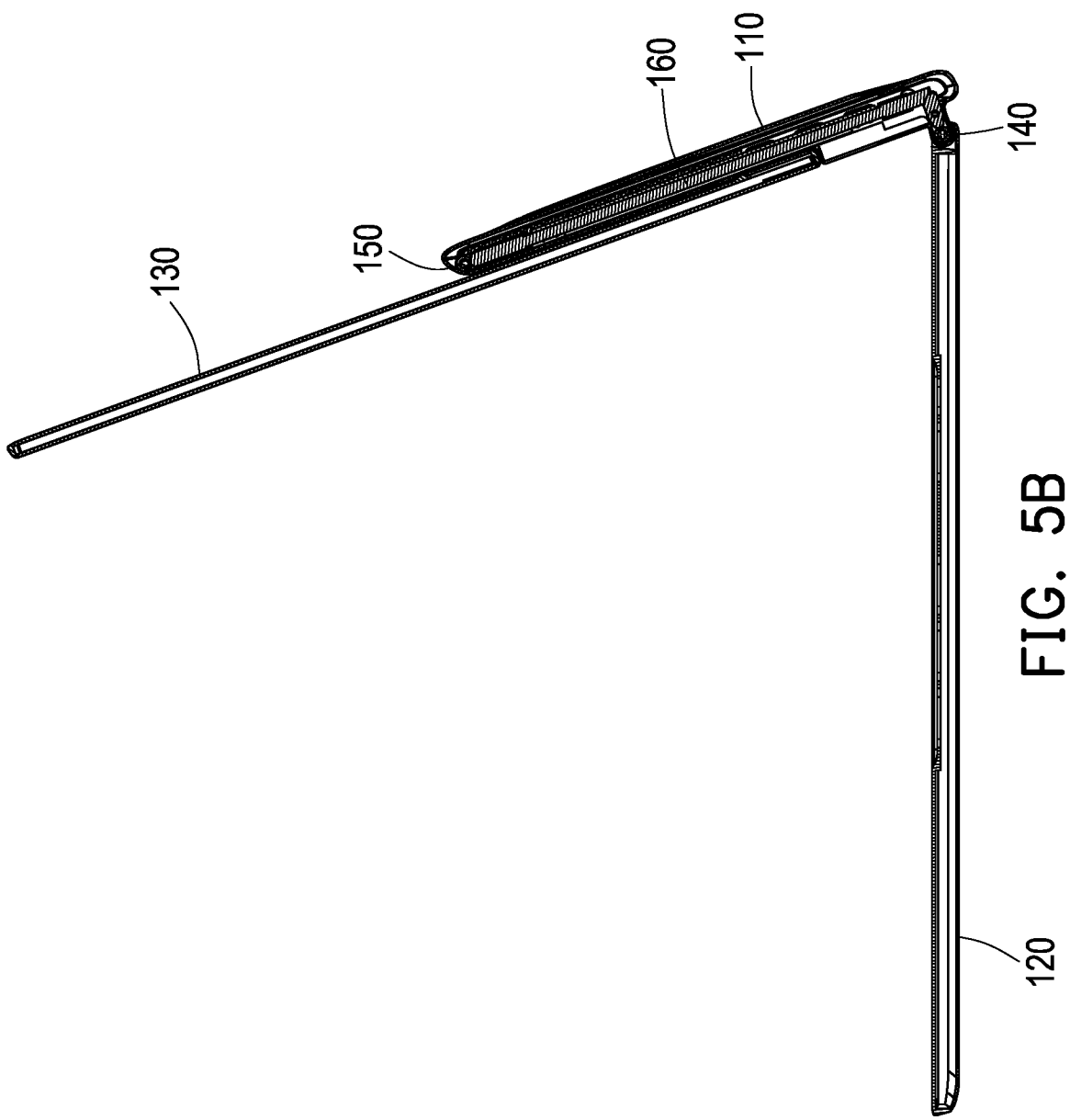
Figure 5C:
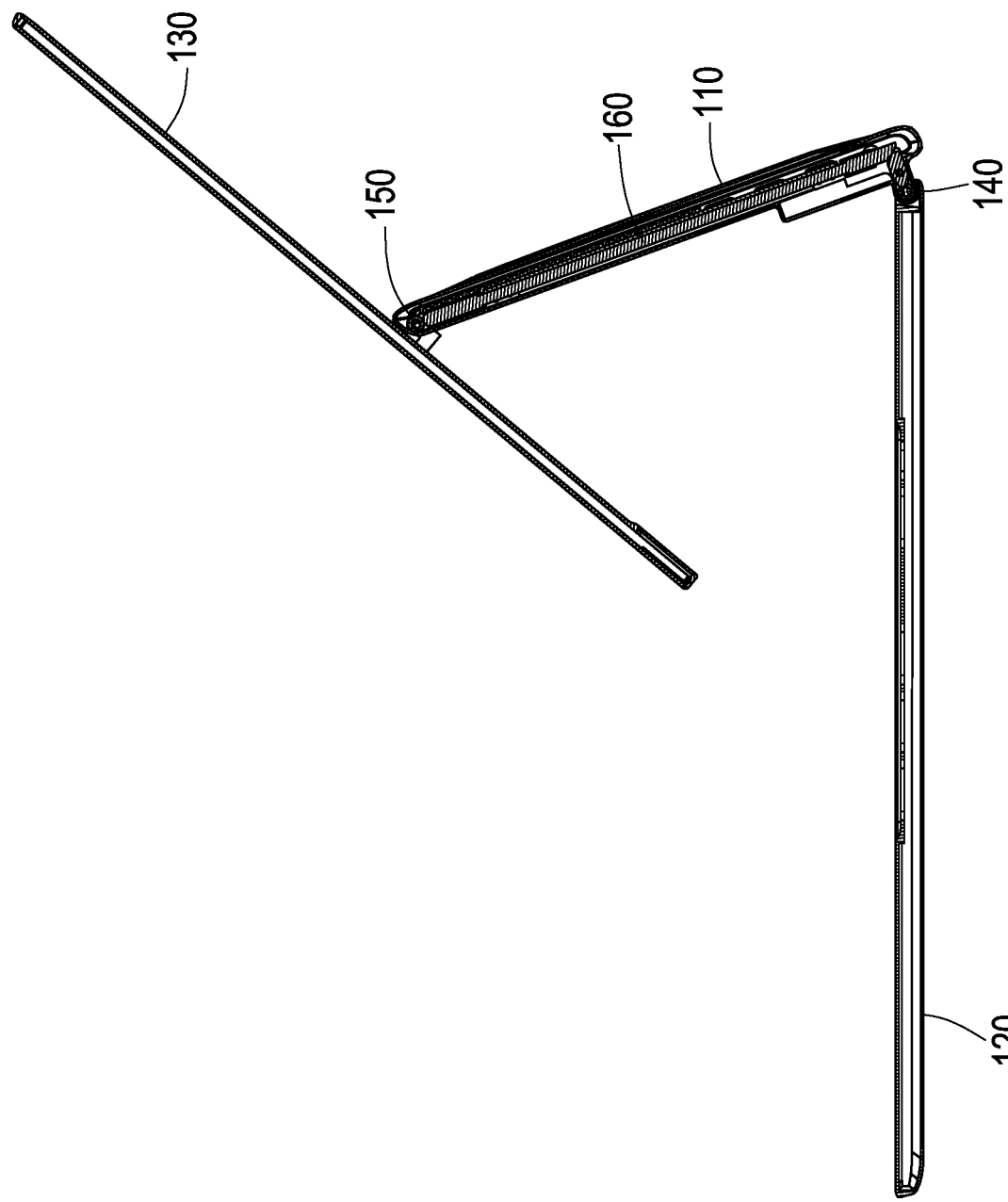
Figure 6:
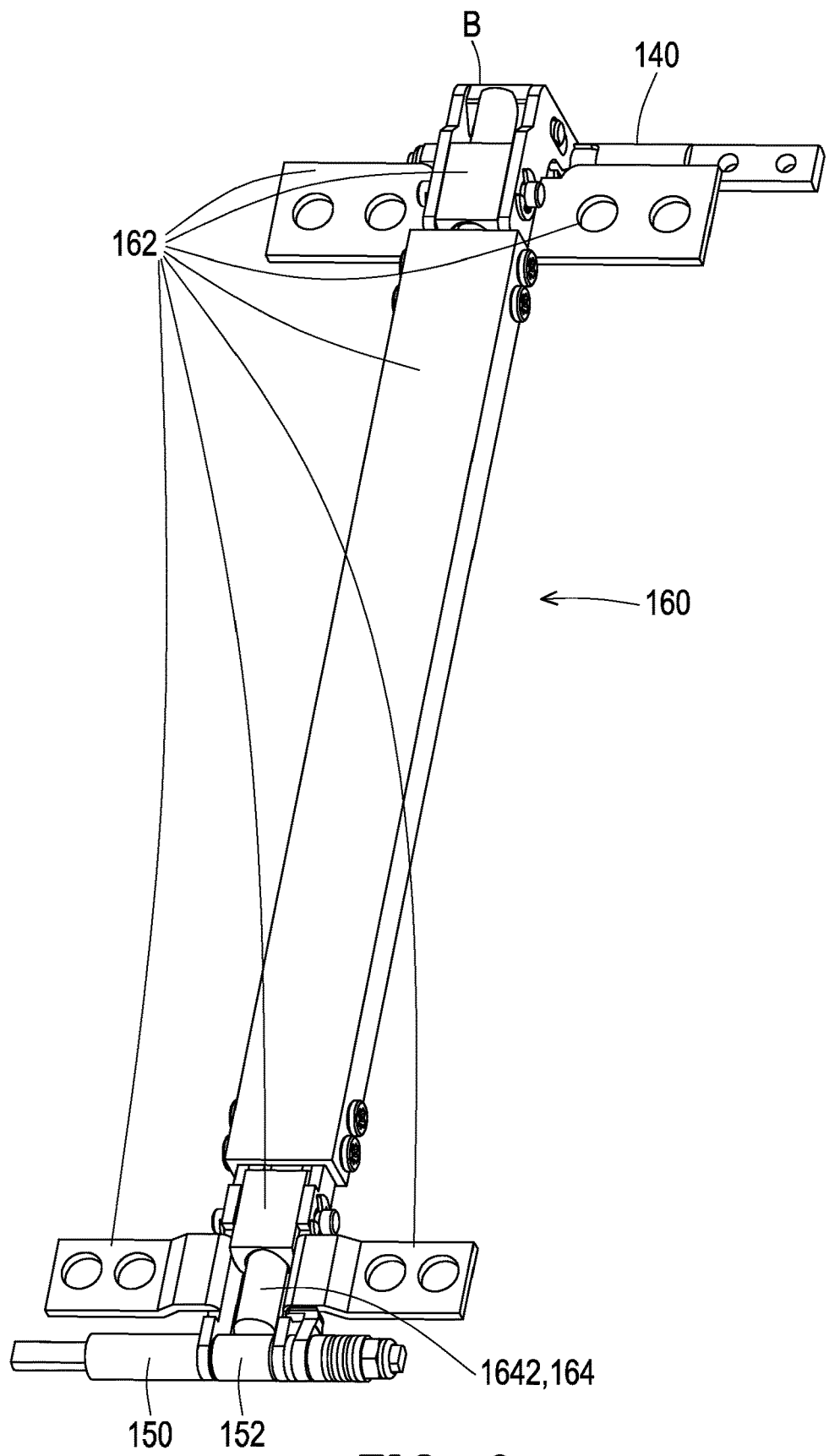
FIG. 6 is a three-dimensional view of the first pivot shaft, the second pivot shaft, and the locking structure of FIG. 5A.

FIG. 5A to FIG. 5C are cross-sectional views of the electronic device of FIG. 1A to FIG. 1C, respectively. FIG. 6 is a three-dimensional view of the first pivot shaft, the second pivot shaft, and the locking structure of FIG. 5A. FIG. 7 is an exploded view of the first pivot shaft, the second pivot shaft, and the locking structure of FIG. 6. Referring to FIG. 5A to FIG. 7, in detail, the electronic device 100 of this embodiment includes a first pivot shaft 140, a second pivot shaft 150, and a locking structure 160. The first body 110 and the second body 120 are pivotally connected to each other through the first pivot shaft 140, the first body 110 and the third body 130 are pivotally connected to each other through the second pivot shaft 150, and the locking structure 160 is disposed on the first body 110. When the expanded angle of the first body 110 relative to the second body 120 is less than the first predetermined angle A1 shown in FIG. 1A, the locking structure 160 locks the first pivot shaft 140, so that the expanded angle of the third body 130 relative to the first body 110 is locked to 0 degrees as described above. When the third body 130 is expanded from the first body 110 as shown in FIG. 1C, the locking structure 160 locks the second pivot shaft 150, so that the expanded angle of the first body 110 relative to the second body 120 is locked to the first predetermined angle A1 as described above.

More specifically, in this embodiment, the locking structure 160 includes a frame body 162 and a locking member 164, the frame body 162 is fixed to the first body 110, and the locking member 164 is slidably disposed on the frame body 162 and has a first locking end 1641 and a second locking end 1642 opposite to each other. The locking member 164 may lock the first pivot shaft 140 through the first locking end 1641, and the locking member 164 may lock the second pivot shaft 150 through the second locking end 1642. More detail is described below with reference to the drawings.

Figure 8A:
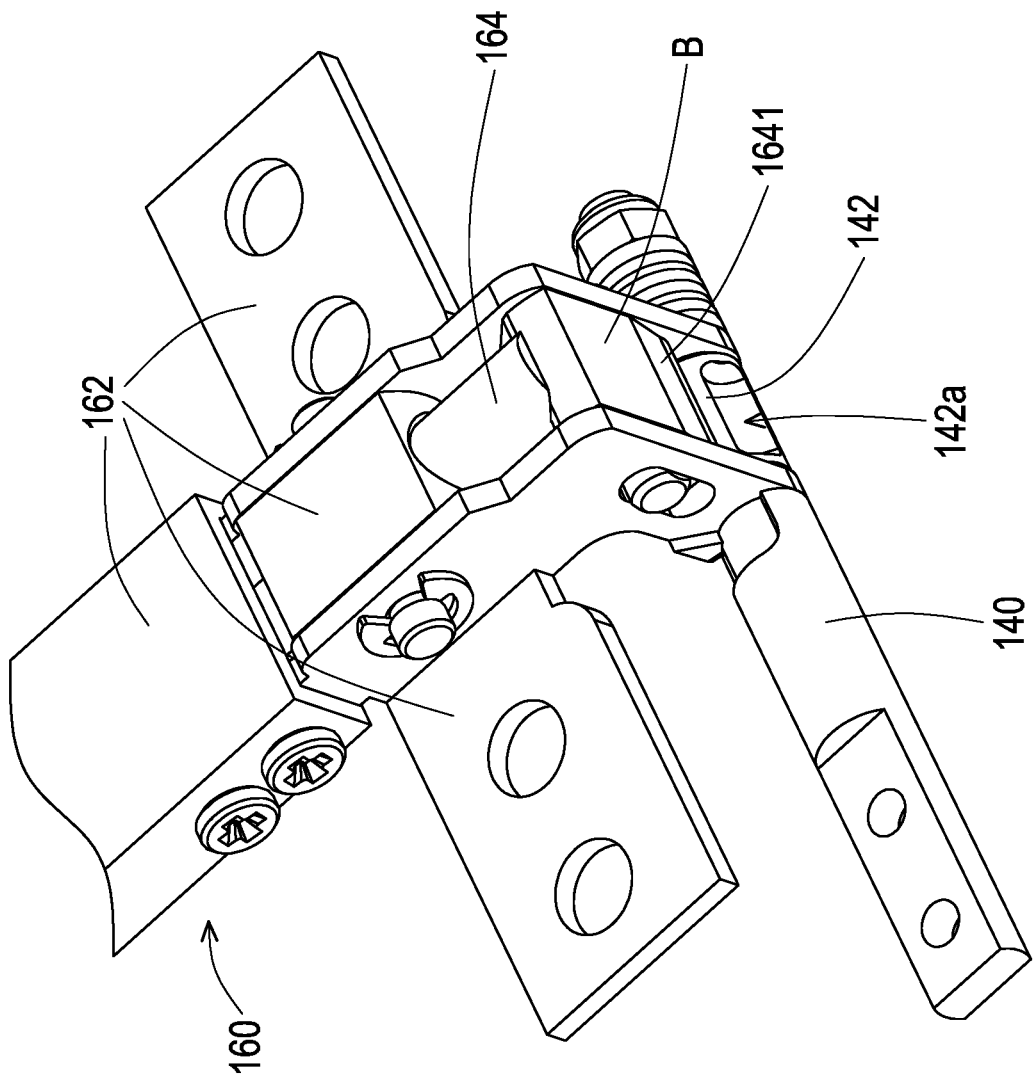
FIG. 8A is a three-dimensional view of the first pivot shaft and a portion of the locking structure of FIG. 5A.
Figure 8B:
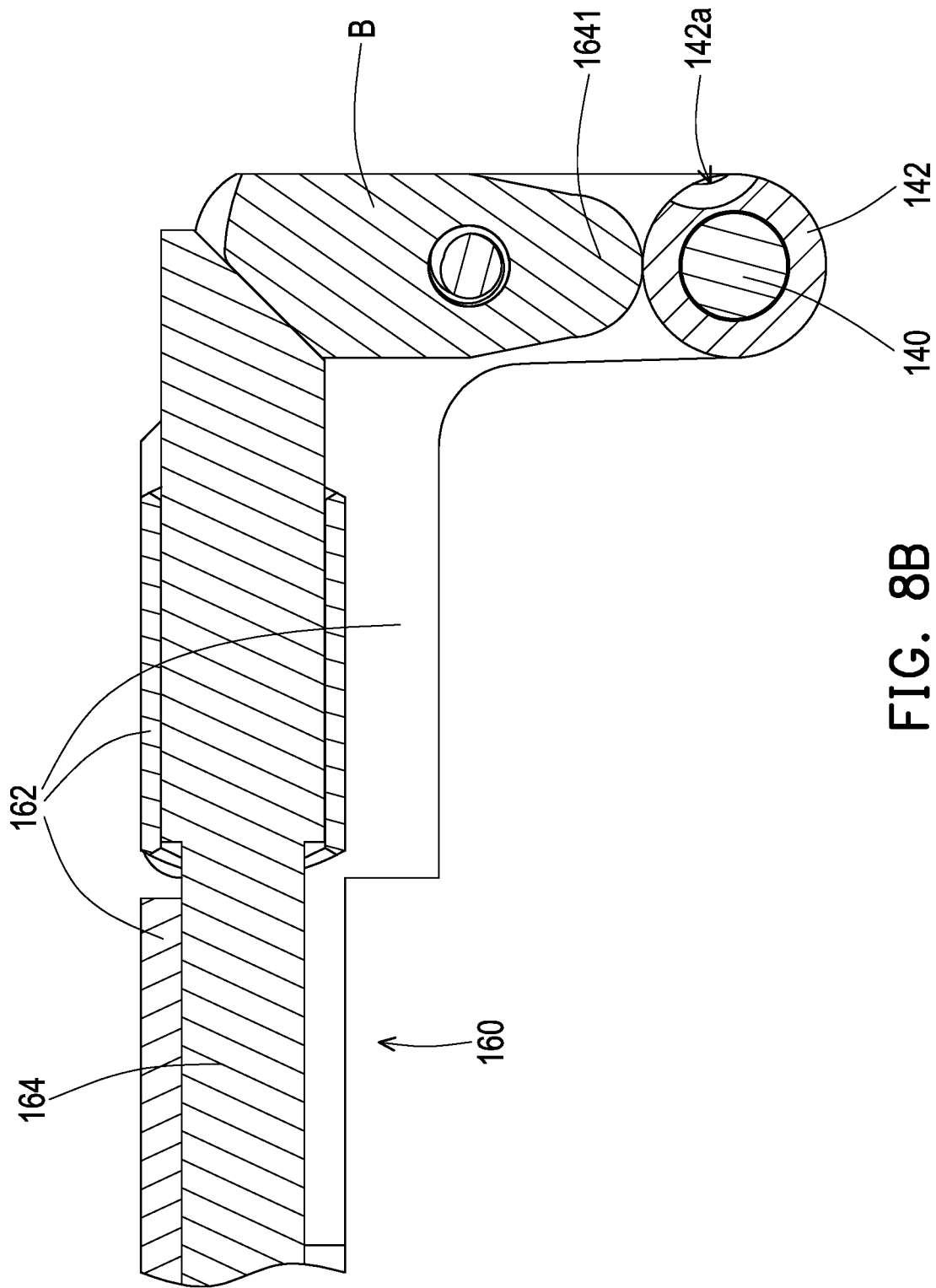
FIG. 8B is a cross-sectional view of the first pivot shaft and the locking structure of FIG. 8A.
Figure 8C:
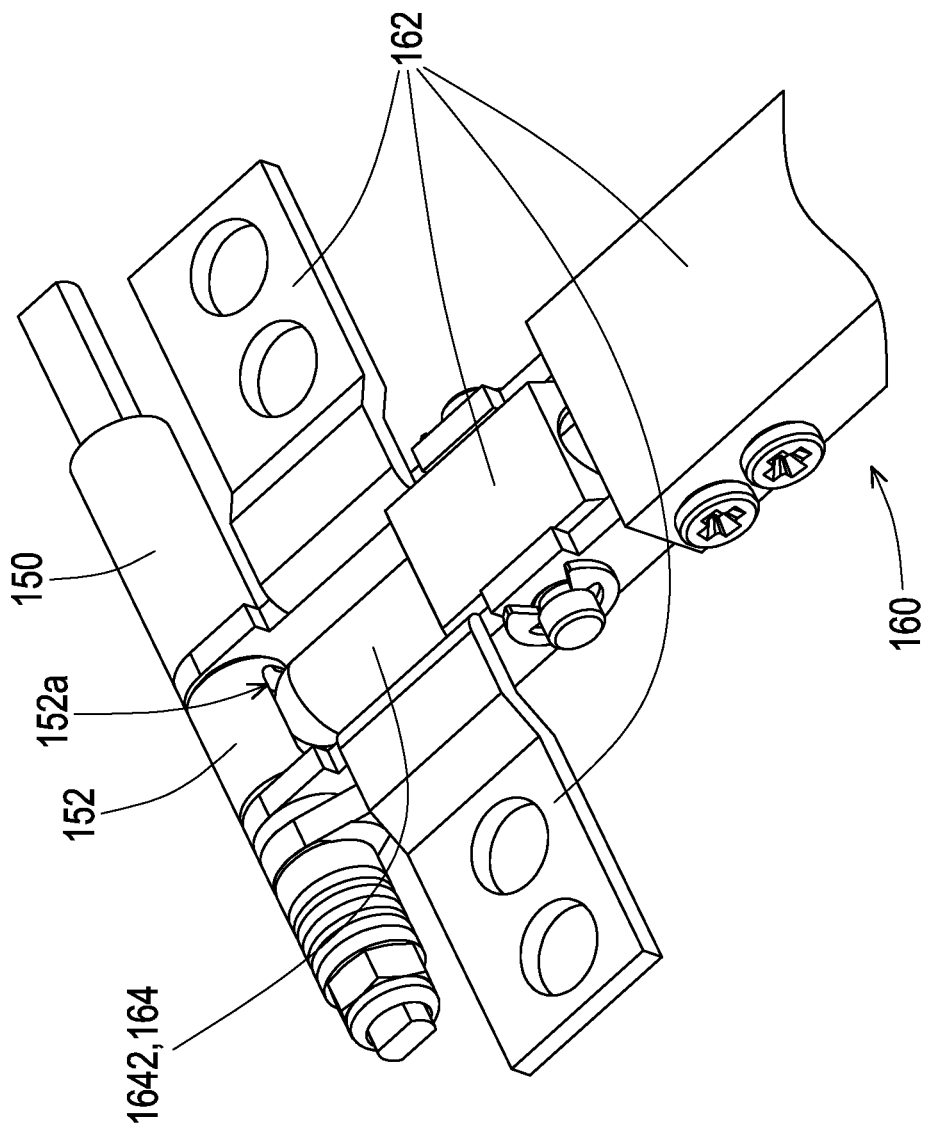
FIG. 8C is a three-dimensional view of the second pivot shaft and a portion of the locking structure of FIG. 5A.

FIG. 8A is a three-dimensional view of the first pivot shaft and a portion of the locking structure of FIG. 5A. FIG. 8B is a cross-sectional view of the first pivot shaft and the locking structure of FIG. 8A. FIG. 8C is a three-dimensional view of the second pivot shaft and a portion of the locking structure of FIG. 5A. FIG. 8D is a cross-sectional view of the second pivot shaft and the locking structure of FIG. 8C. As shown in FIG. 8A and FIG. 8B, the first pivot shaft 140 of the present embodiment has a locking member 142, the locking member 142 has a first concave portion 142a, and the first concave portion 142a corresponds to the first locking end 1641 of the locking member 164. The locking member 164 may include its main body and a slider B. The first locking end 1641 is, for example, formed on the slider B, and the main body of the locking member 164 and the slider B may push against each other and move together through their inclined surfaces. As shown in FIG. 8C and FIG. 8D, the second pivot shaft 150 of this embodiment has a locking member 152, and the locking member 152 has a second concave portion 152a.

Figure 9A:
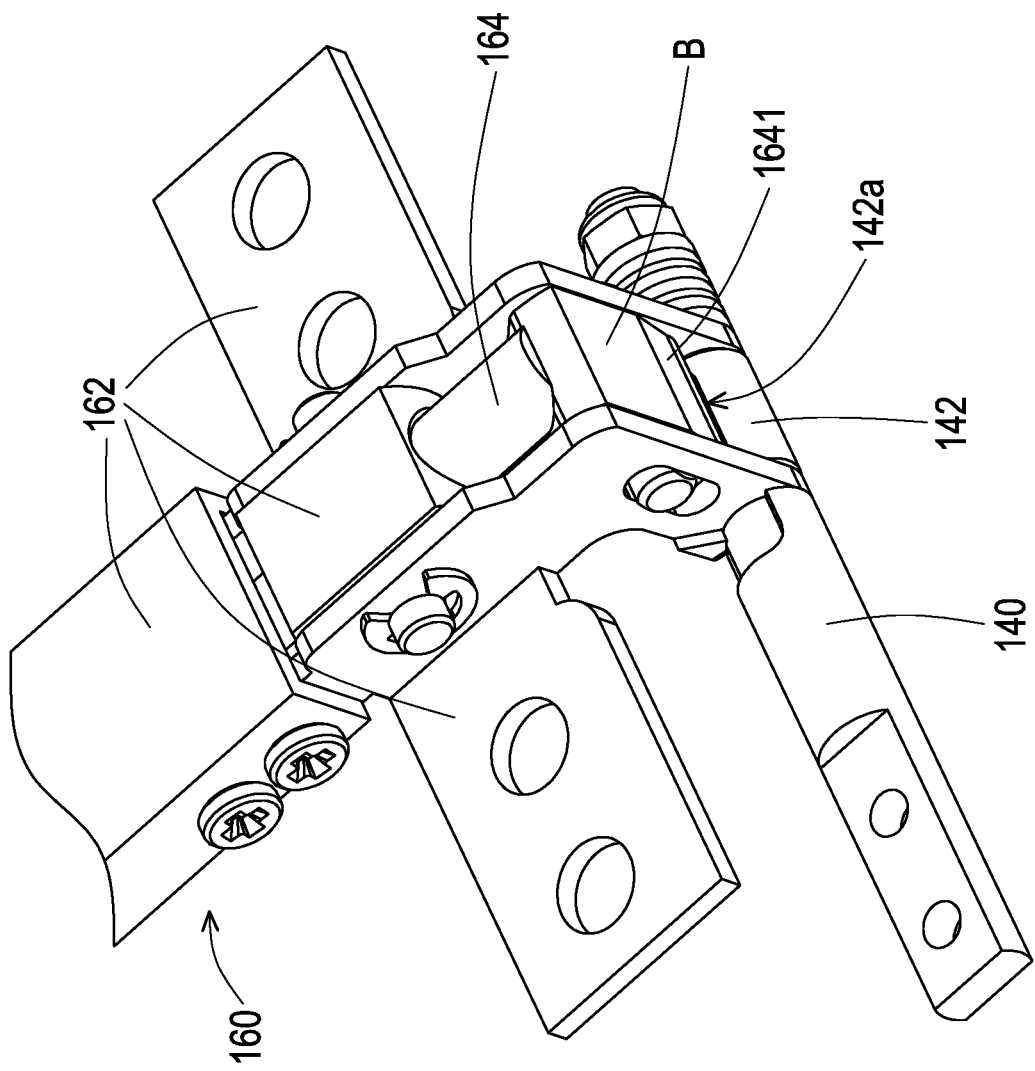
FIG. 9A is a three-dimensional view of the first pivot shaft and a portion of the locking structure of FIG. 5B.
Figure 9B:
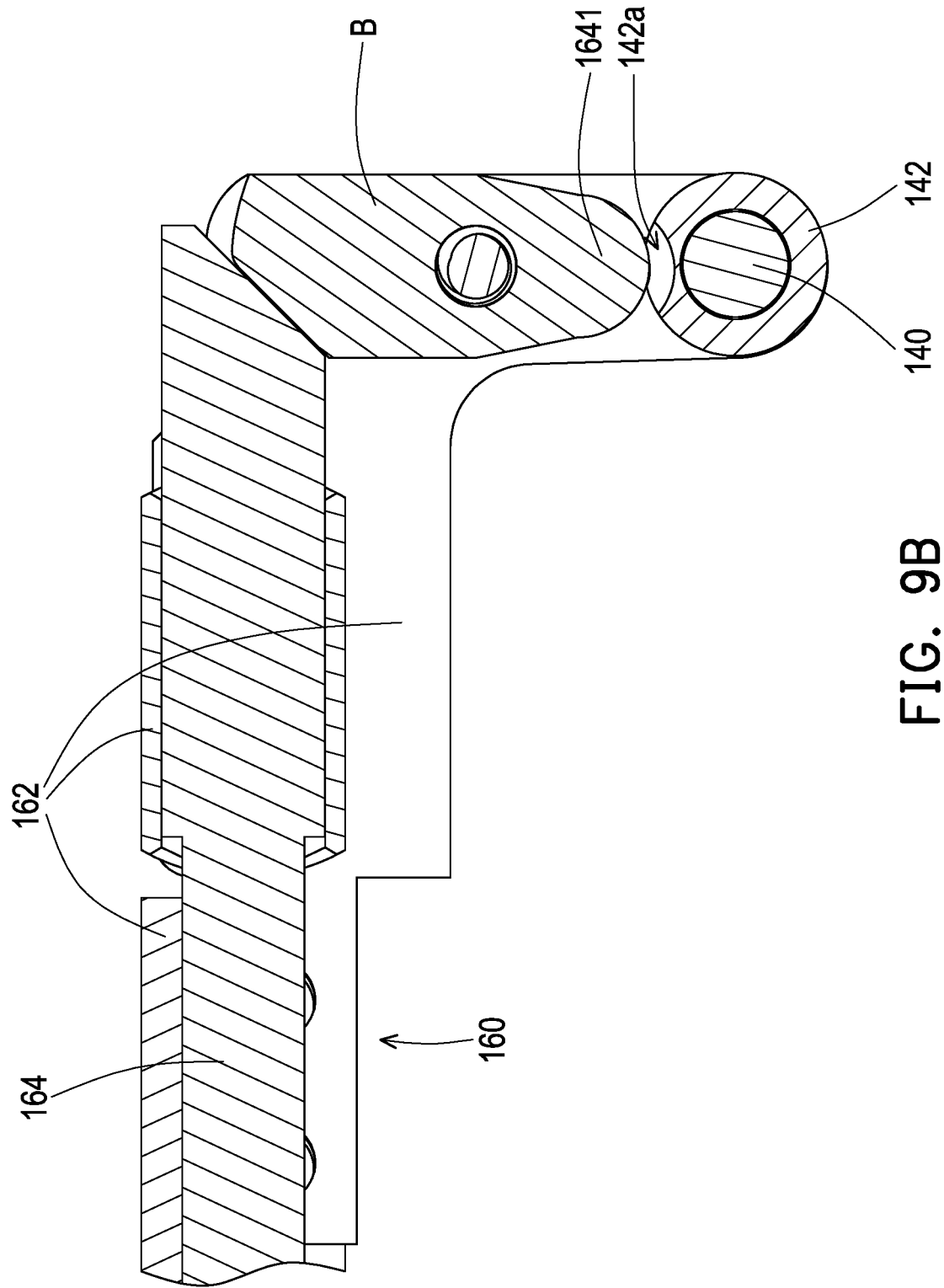
FIG. 9B is a cross-sectional view of the first pivot shaft and the locking structure of FIG. 9A.
Figure 10A:
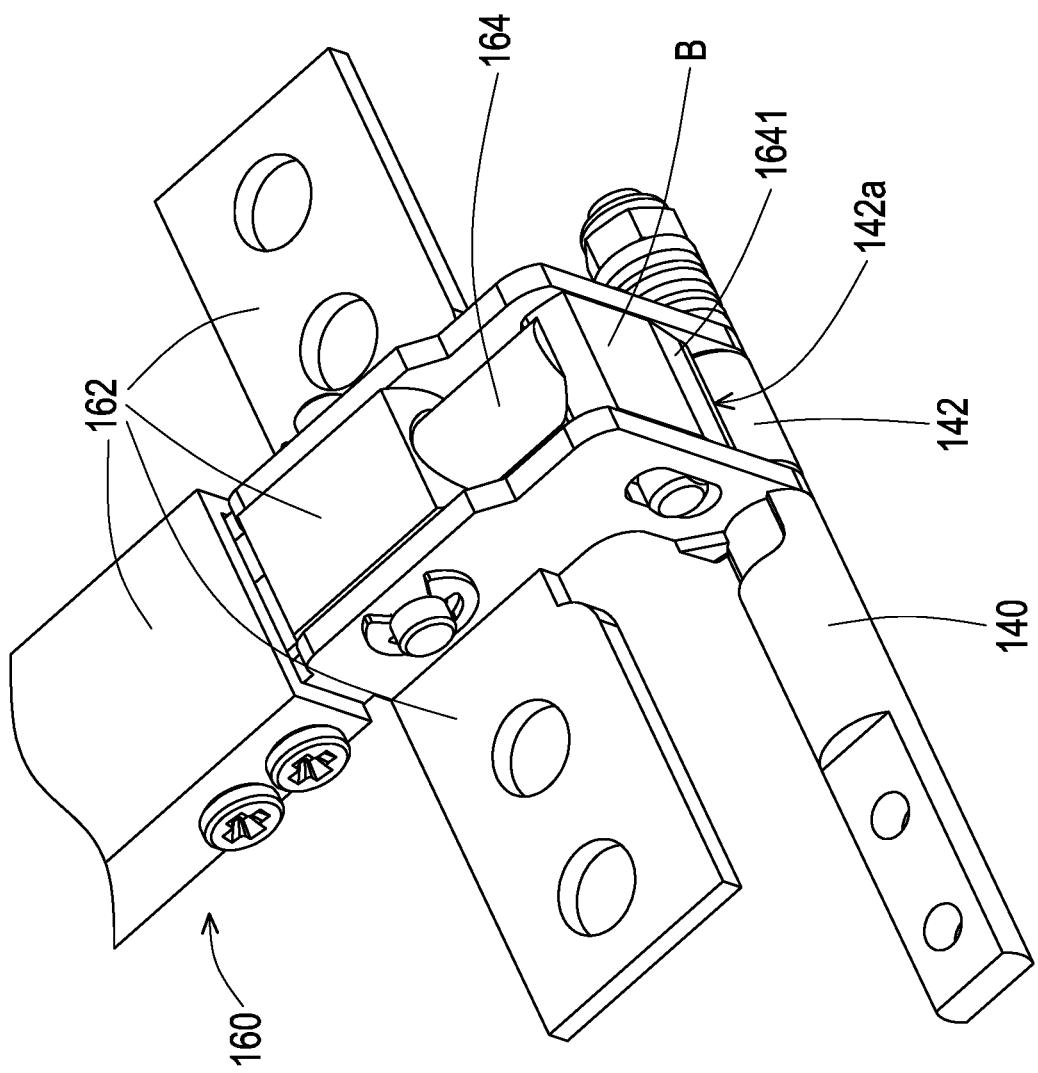
FIG. 10A illustrates that the first locking portion of FIG. 9A is locked in the first concave portion.
Figure 10B:
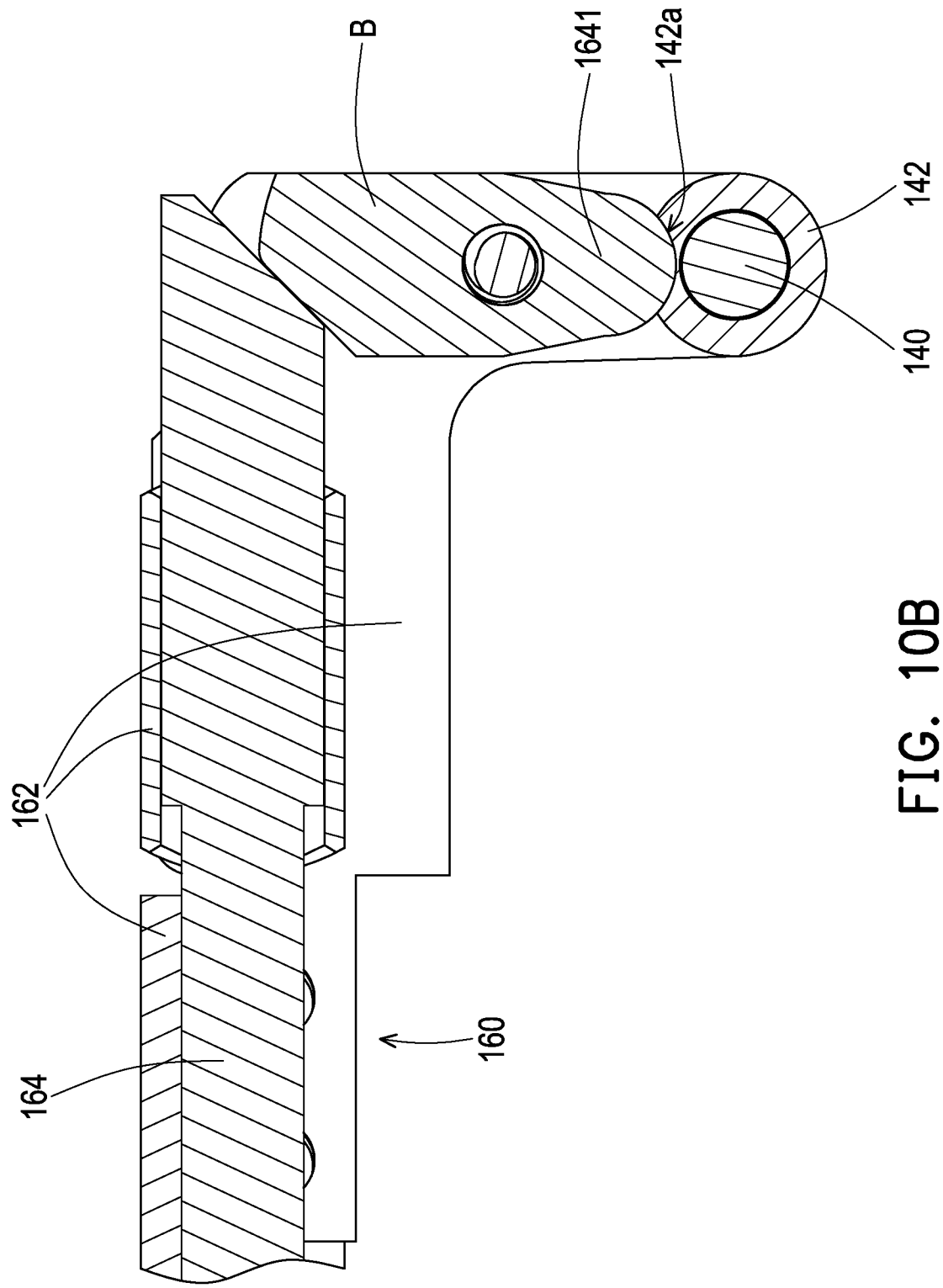
FIG. 10B illustrates that the first locking portion of FIG. 9B is locked in the first concave portion.
Figure 10C:
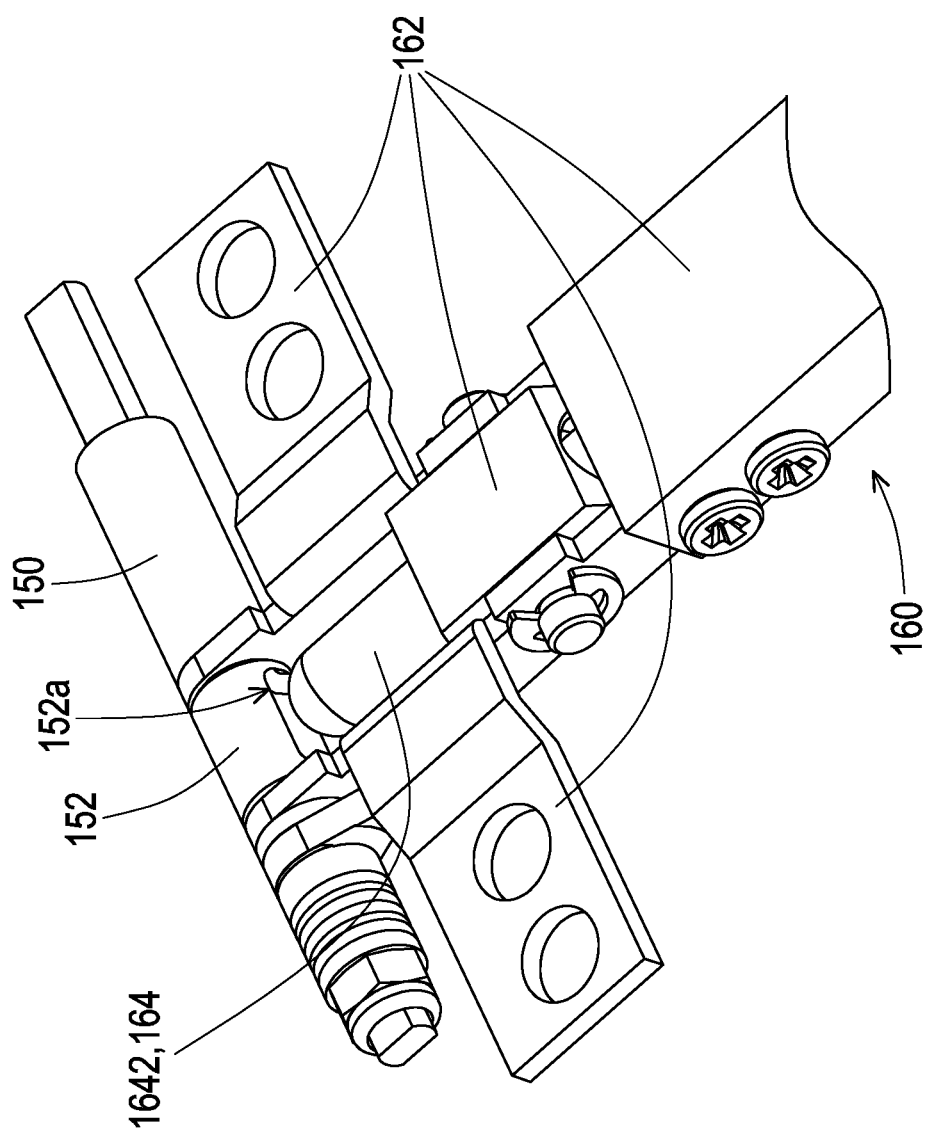
FIG. 10C illustrates that the second locking portion of FIG. 8C is moved away from the second concave portion.
Figure 10D:
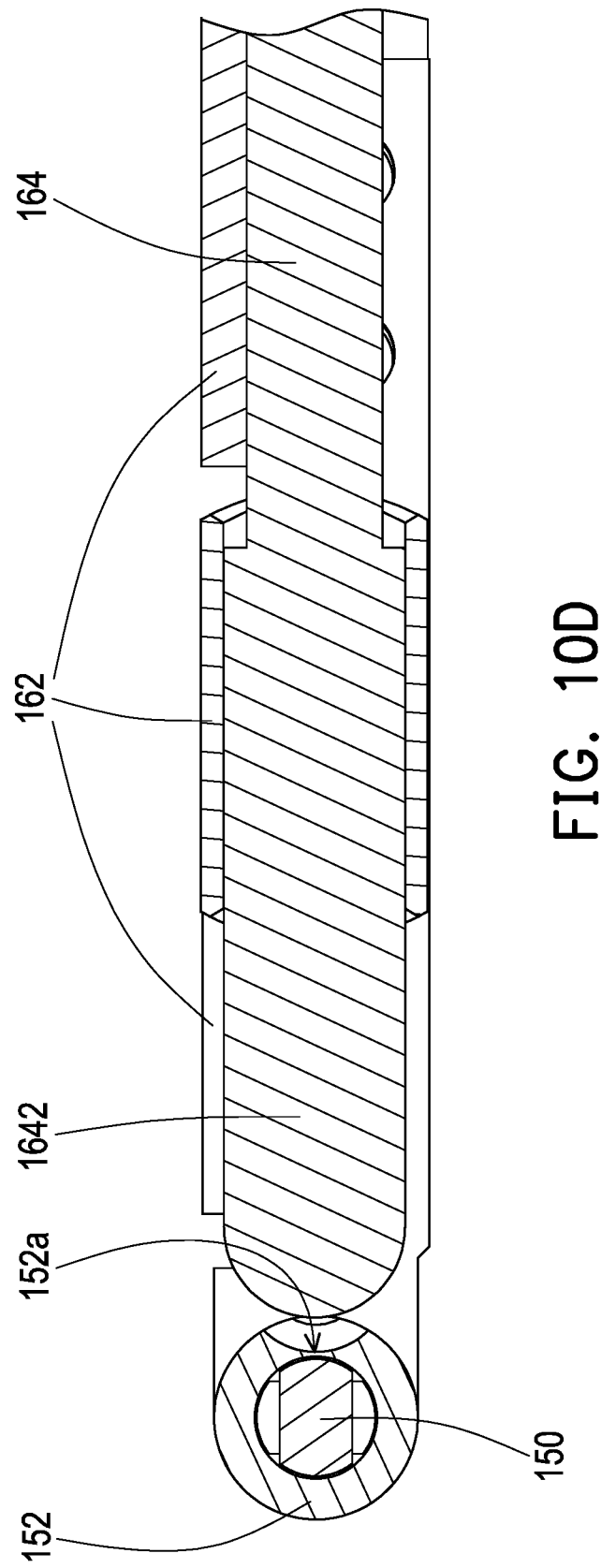
FIG. 10D illustrates that the second locking portion of FIG. 8D is moved away from the second concave portion.

When the expanded angle of the first body 110 relative to the second body 120 is less than the first predetermined angle A1 (marked in FIG. 1B and FIG. 1C), the first concave portion 142a of the first pivot shaft 140 is misaligned with the first locking end 1641 of the locking member 164, as shown in FIG. 8A and FIG. 8B. The second concave portion 152a of the second pivot shaft 150 is aligned with the second locking end 1642 of the locking member 164, as shown in FIG. 8C and FIG. 8D, and the second locking end 1642 is locked in the second concave portion 152a to lock the second pivot shaft 150. When the expanded angle of the first body 110 relative to the second body 120 is the first predetermined angle A1 (marked in FIG. 1B and FIG. 1C), the first concave portion 142a of the first pivot shaft 140 rotates with the first pivot shaft 140 and is aligned with the first locking end 1641 of the locking member 164, as in FIG. 9A and FIG. 9B. At this time the locking member 164 is adapted to slide relative to the frame body 162 so that the first locking end 1641 is locked in the first concave portion 142a, as shown in FIG. 10A and FIG. 10B, to lock the first pivot shaft 140, and that the second locking end 1642 is moved away from the second concave portion 152a, as shown in FIG. 10C and FIG. 10D, to release the second pivot shaft 150.

The disclosure does not limit the locking manner of the first pivot shaft 140 and the second pivot shaft 150, which is exemplified and described with the drawings below.

Figure 11A:
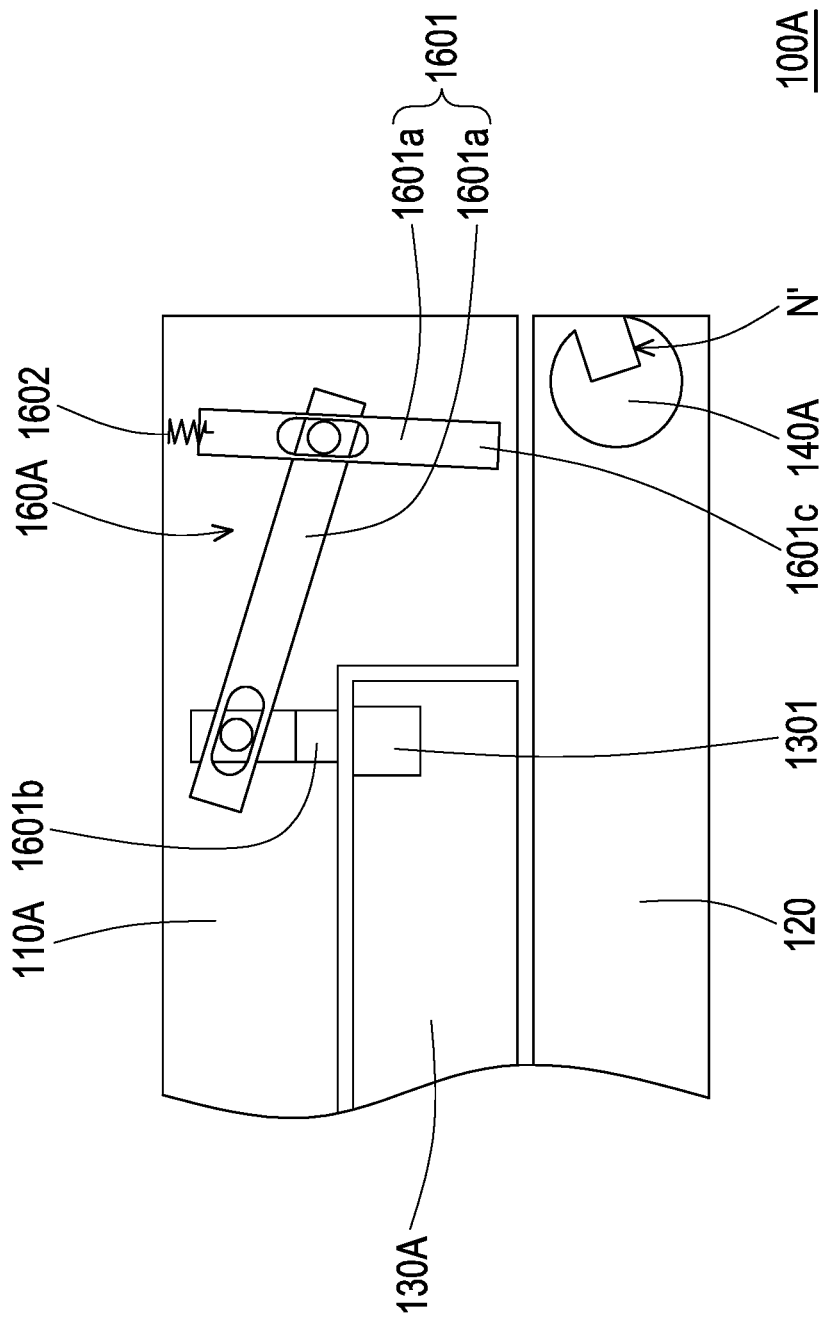
FIG. 11A to FIG. 11C are side schematic views of various states of an electronic device according to another embodiment of the disclosure.
Figure 11B:
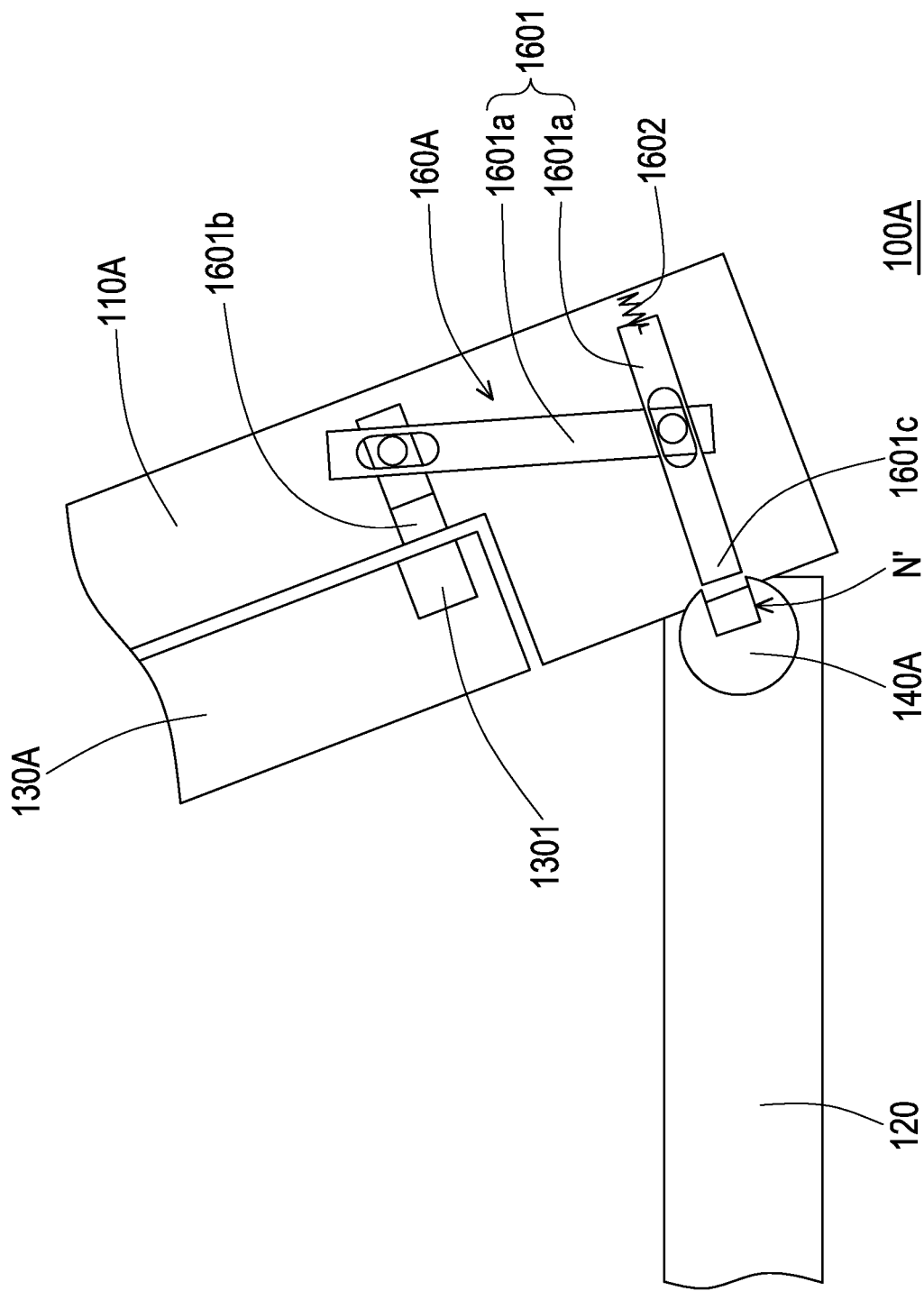
Figure 11C:
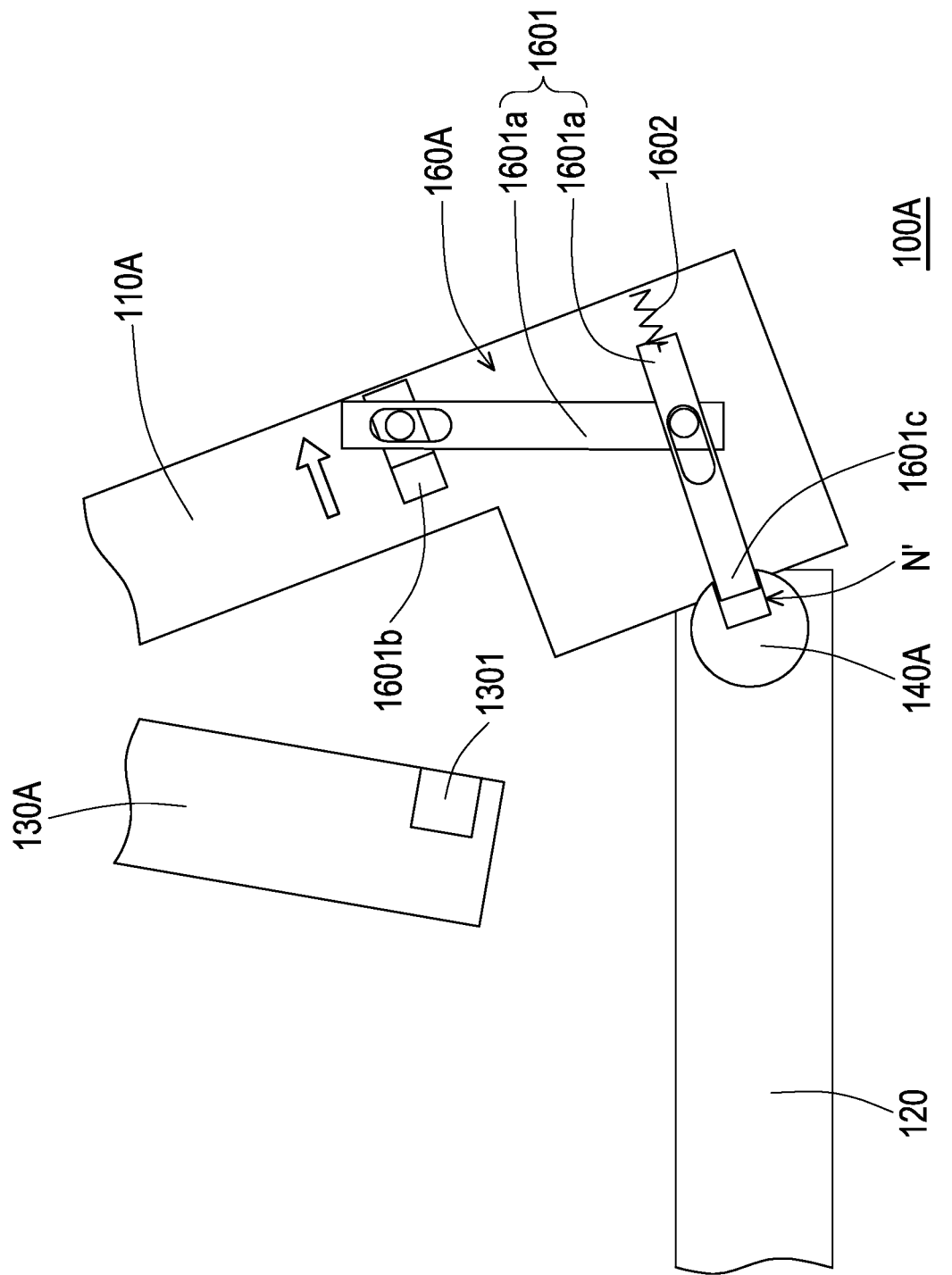

FIG. 11A to FIG. 11C are side schematic views of various states of an electronic device according to another embodiment of the disclosure. The main difference between the embodiment shown in FIG. 11A to FIG. 11C and the previous embodiment lies in the composition and mode of action of the locking structure. The configuration and the manner of actuation of the remaining components are the same or similar to those of the previous embodiment, which are not repeated here. The same or similar components to the previous embodiment are denoted by the same or similar reference numerals. The locking structure 160A of an electronic device 100A shown in FIG. 11A to FIG. 11C is disposed on a first body 110A and is adapted to lock a first pivot shaft 140A or a third body 130A. Specifically, the first pivot shaft 140A has a concave portion N1, the third body 130 has a first magnetic portion 1301, and the locking structure 160A includes a connecting rod assembly 1601, the connecting rod assembly 1601 is, for example, composed of two connecting rods 1601a movably connected to each other and has a second magnetic portion 1601b and a locking end 1601c.

When the connecting rod assembly 1601 is in a first state as shown in FIG. 11A and FIG. 11B, the magnetic attraction between the first magnetic portion 1301 and the second magnetic portion 1601b closes the third body 130A to the first body 110A, and the connecting rod assembly 1601 is limited by the magnetic attraction between the first magnetic portion 1301 and the second magnetic portion 1601b and is maintained in the first state. When the user resists the magnetic attraction between the first magnetic portion 1301 and the second magnetic portion 1601b and expands the third body 130A from the first body 110A as shown in FIG. 11C, the connecting rod assembly 1601 is no longer limited by the magnetic attraction between the first magnetic portion 1301 and the second magnetic portion 1601b, and may be actuated from the first state to a second state shown in FIG. 11C, so that the locking end 1601c is locked in the concave portion N1 to lock the first pivot shaft 140A. When the user closes the third body 130A to the first body 110A, the connecting rod assembly 1601 is reset to the first state shown in FIG. 11B through the magnetic attraction between the first magnetic portion 1301 and the second magnetic portion 1601b, to release the first pivot shaft 140A.

In this embodiment, the locking structure 160A may further include an elastic member 1602, and the elastic member 1602 is connected between the connecting rod assembly 1601 and the first body 110A. The connecting rod assembly 1601 may be actuated from the first state to the second state through the elastic force of the elastic member 1602.

Figure 12A:
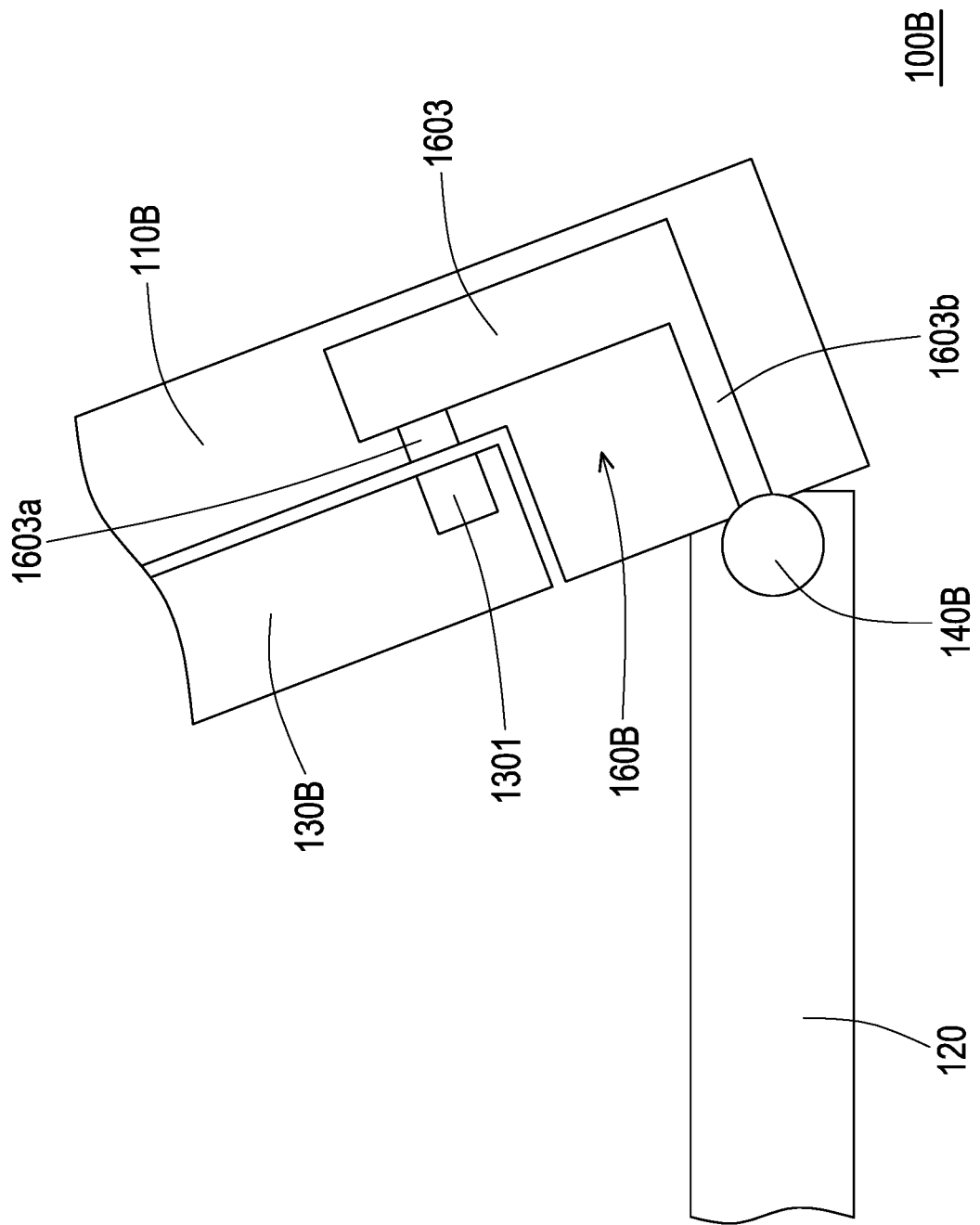
FIG. 12A to FIG. 12B are side schematic views of various states of an electronic device according to another embodiment of the disclosure.
Figure 12B:
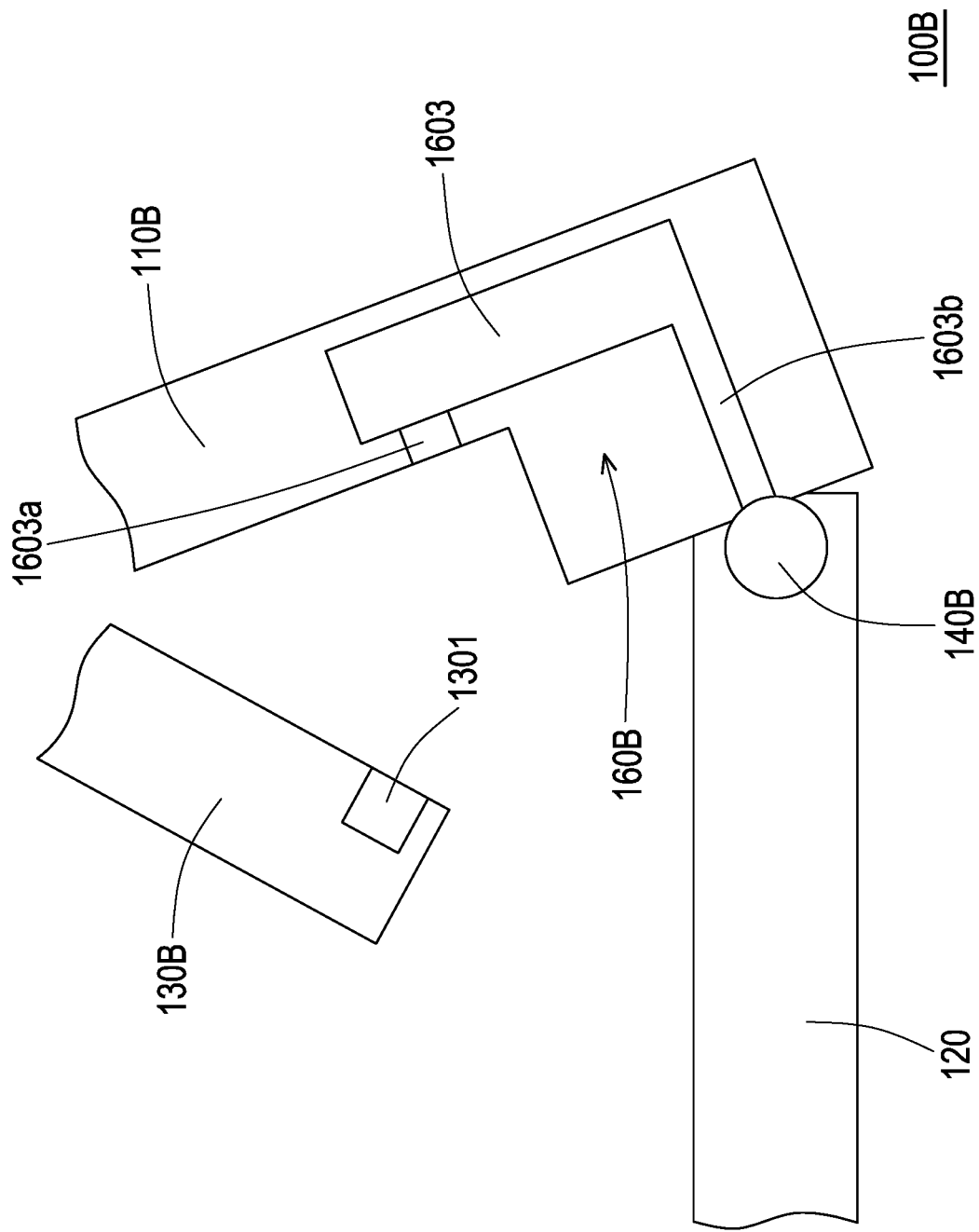
Figure 13A:
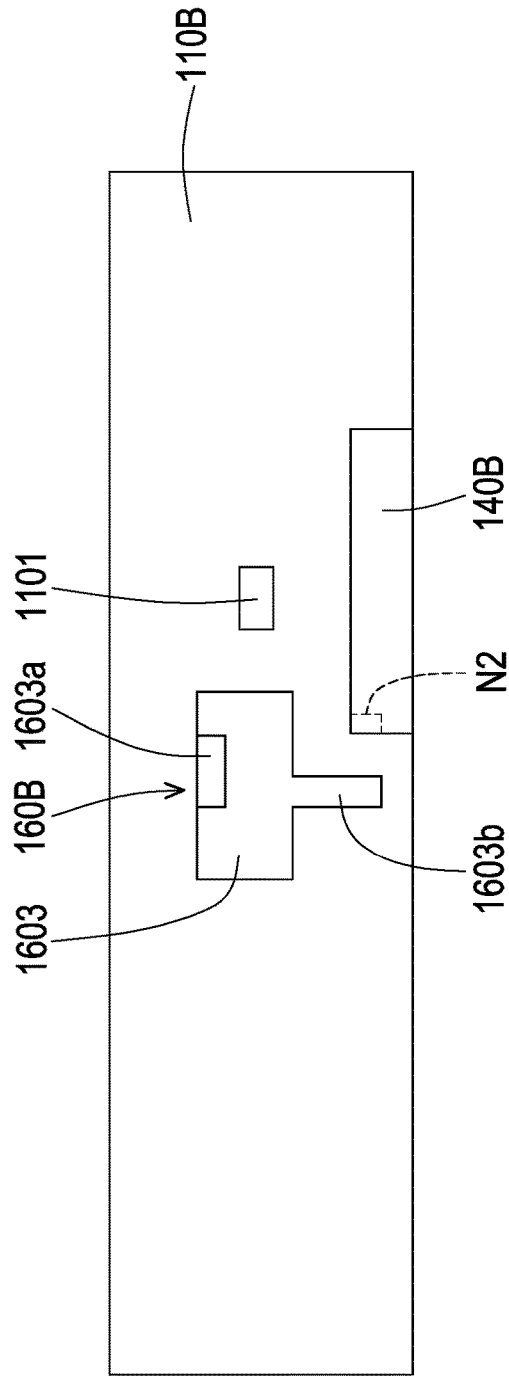
FIG. 13A to FIG. 13B are top schematic views of the first body of FIG. 12A to FIG. 12B, respectively.
Figure 13B:
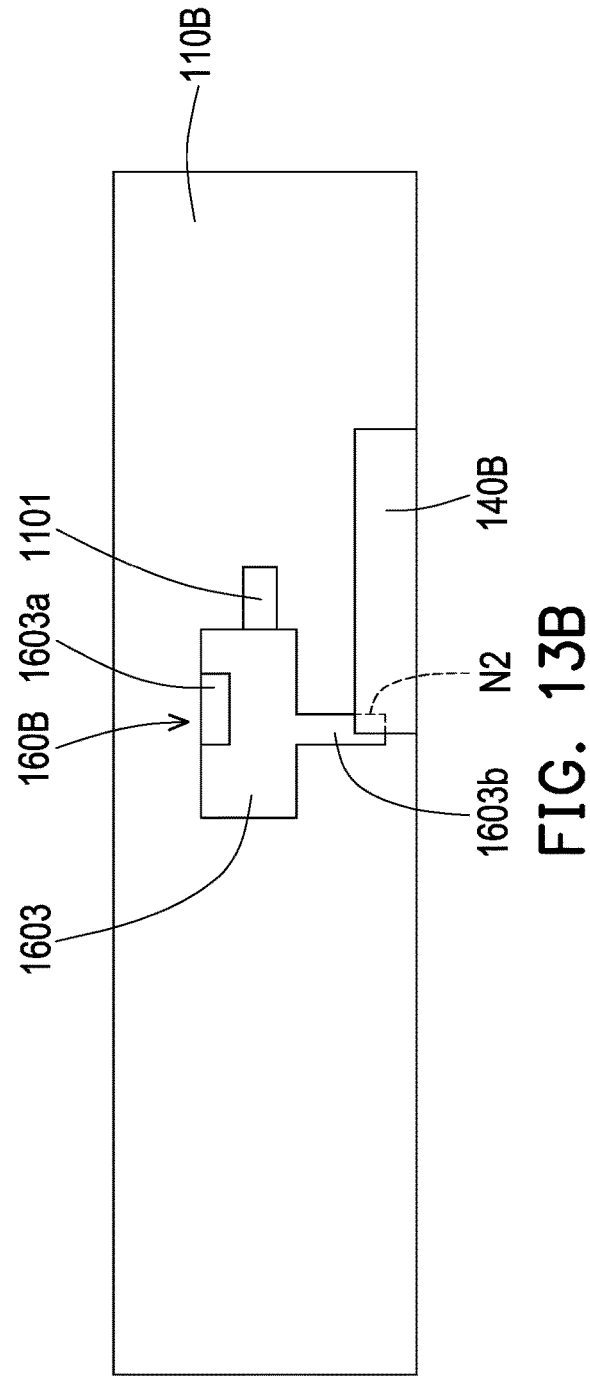

FIG. 12A to FIG. 12B are side schematic views of various states of an electronic device according to another embodiment of the disclosure. FIG. 13A to FIG. 13B are top schematic views of the first body of FIG. 12A to FIG. 12B, respectively. The main difference between the embodiment shown in FIG. 12A to FIG. 13B and the previous embodiment lies in the composition and mode of action of the locking structure. The configuration and the manner of actuation of the remaining components are the same or similar to those of the previous embodiment, which are not repeated here. The same or similar components to the previous embodiment are denoted by the same or similar reference numerals. In an electronic device 100B shown in FIG. 12A to FIG. 13B, a first pivot shaft 140B has a concave portion N2, a third body 130B has a first magnetic portion 1301, a locking structure 160B includes a locking member 1603, the locking member 1603 has a second magnetic portion 1603a and a locking end 1603b, and a first body 110B has a third magnetic portion 1101.

When the locking member 1603 is in a first state as shown in FIG. 12A and FIG. 13A, the magnetic attraction between the first magnetic portion 1301 and the second magnetic portion 1603a closes the third body 130B to the first body 110B. When the user resists the magnetic attraction between the first magnetic portion 1301 and the second magnetic portion 1603a and expands the third body 130B from the first body 110B as shown in FIG. 12B, and moves the first magnetic portion 1301 away from the second magnetic portion 1603a, the locking member 1603 is actuated from the first state to a second state shown in FIG. 13B through the magnetic attraction between the second magnetic portion 1603a and the third magnetic portion 1101, which drives the locking end 1603b to be locked in the concave portion N2, to lock the first pivot shaft 140B. When the user closes the third body 130B to the first body 110B, the locking member 1603 is reset to the first state shown in FIG. 13A through the magnetic attraction between the first magnetic portion 1301 and the second magnetic portion 1603a, to release the first pivot shaft 140B.

In this embodiment, the magnetic attraction between the first magnetic portion 1301 and the second magnetic portion 1603a is greater than the magnetic attraction between the second magnetic portion 1603a and the third magnetic portion 1101 to prevent the locking member 1603 in the state shown in FIG. 12A from being actuated unexpectedly to a position shown in FIG. 13B due to the magnetic attraction between the second magnetic portion 1603a and the third magnetic portion 1101.

Based on the above-mentioned embodiment, the third body may be supported away from the second body by the first body, and further elements may be added at the lower end of the third body, which is exemplified and described with the drawings below.

Figure 14A:
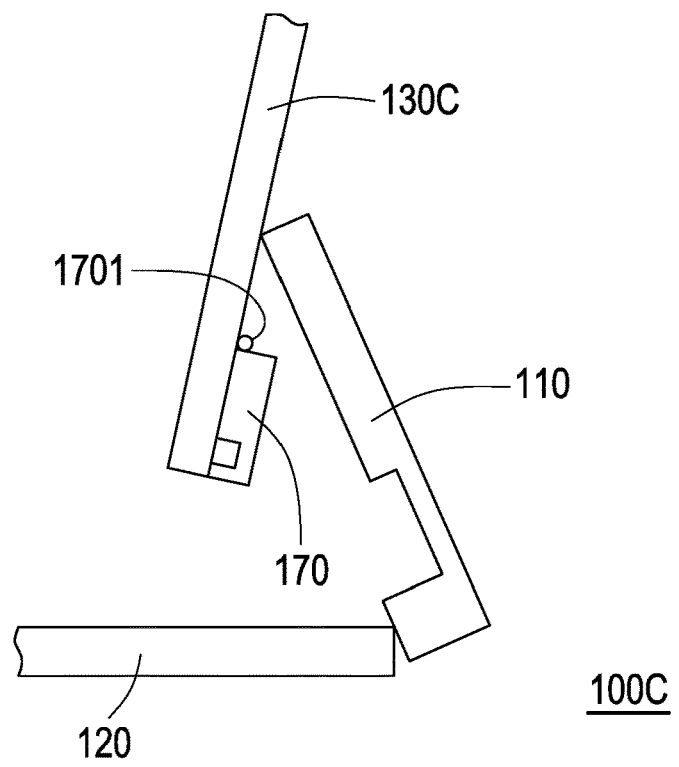
FIG. 14A to FIG. 14C are side schematic views of various states of an electronic device according to another embodiment of the disclosure.
Figure 14B:
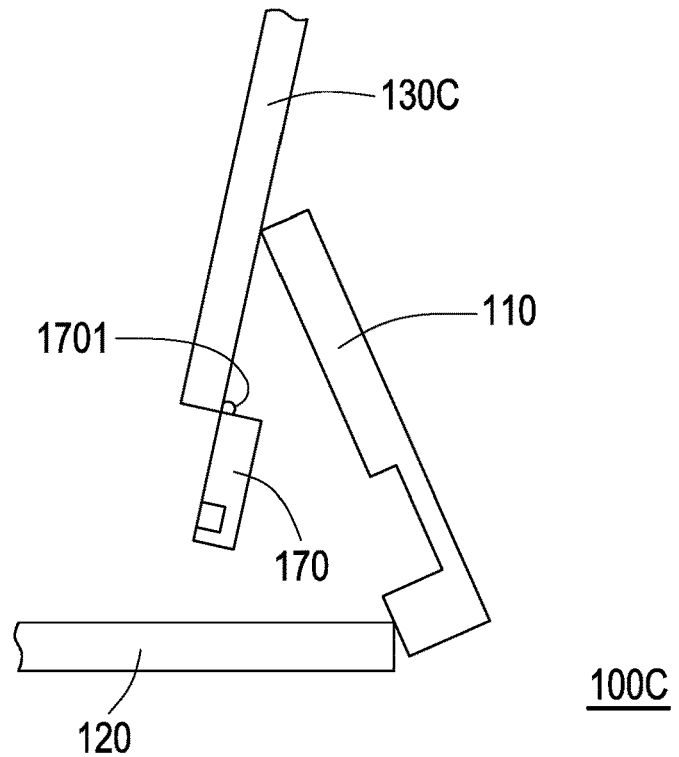
Figure 14C:
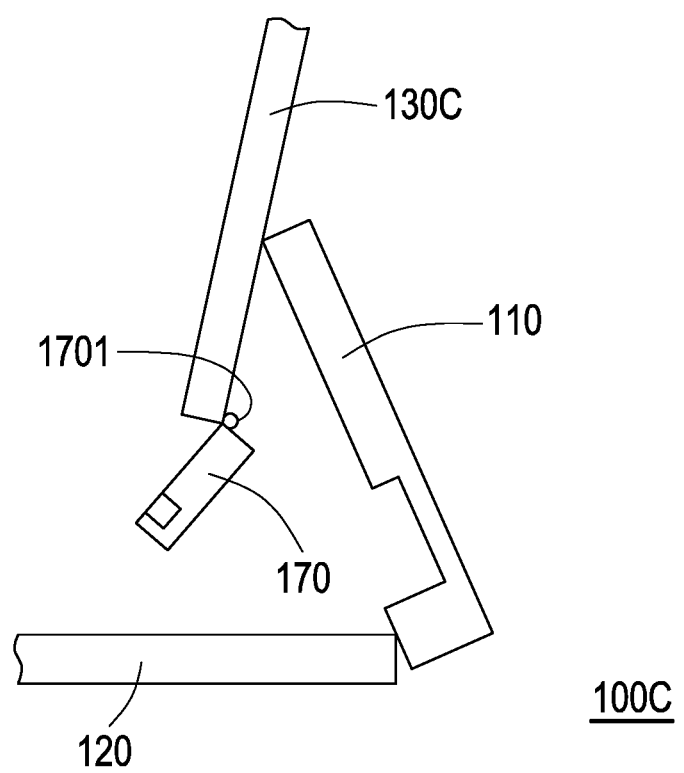

FIG. 14A to FIG. 14C are side schematic views of various states of an electronic device according to another embodiment of the disclosure. The main difference between the embodiment shown in FIG. 14A to FIG. 14C and the previous embodiment lies in the addition of elements at the lower end of the third body. The configuration and the manner of actuation of the remaining components are the same or similar to those of the previous embodiment, which are not repeated here. The same or similar components to the previous embodiment are denoted by the same or similar reference numerals. An electronic device 100C shown in FIG. 14A to FIG. 14C further includes an image capturing assembly 170, and the image capturing assembly 170 is movably disposed on the rear side of a third body 130C and is close to the bottom end of the third body 130C. Specifically, a rotating shaft 1701 of the image capturing assembly 170 is rotatably and slidably connected to the third body 130C. When the electronic device 100C is in the operation state shown in FIG. 14A to FIG. 14C, the image capturing assembly 170 is adapted to slide from the rear side of the third body 130C to the bottom of the third body 130C and protrude outwards as shown in FIG. 14A to FIG. 14B, and the image capturing assembly 170 is adapted to flip with its rotating shaft 1701 as the axis as shown in FIG. 14B to FIG. 14C to adjust the capturing angle.

Figure 15A:
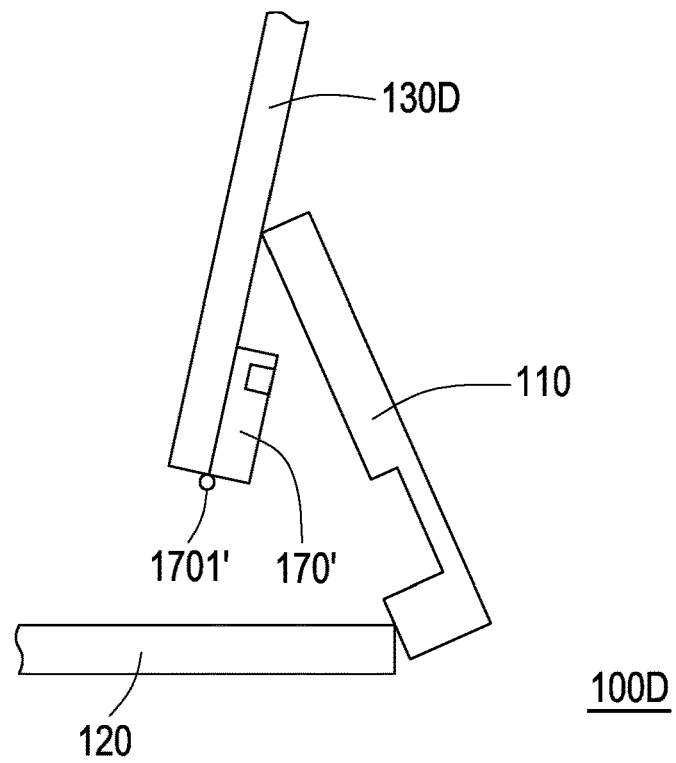
FIG. 15A to FIG. 15C are side schematic views of various states of an electronic device according to another embodiment of the disclosure.
Figure 15B:
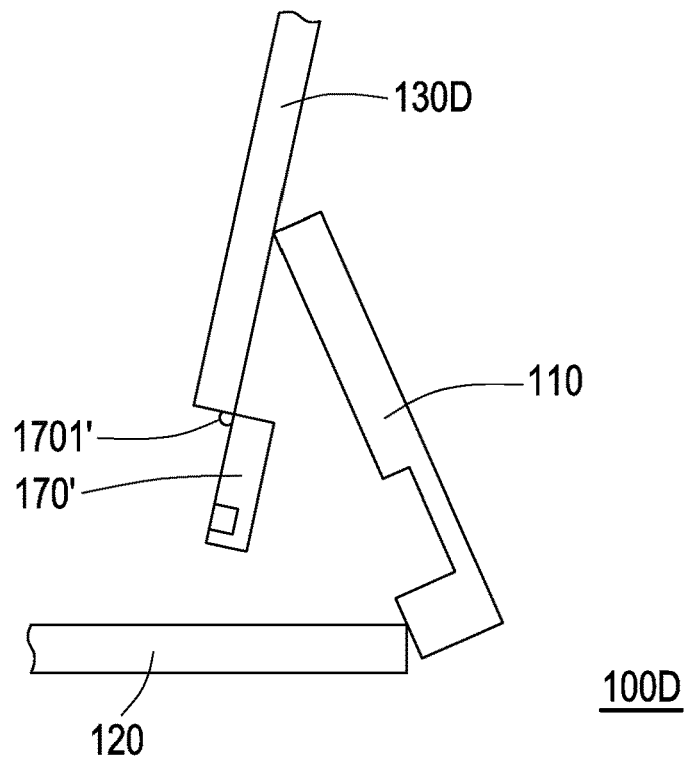
Figure 15C:
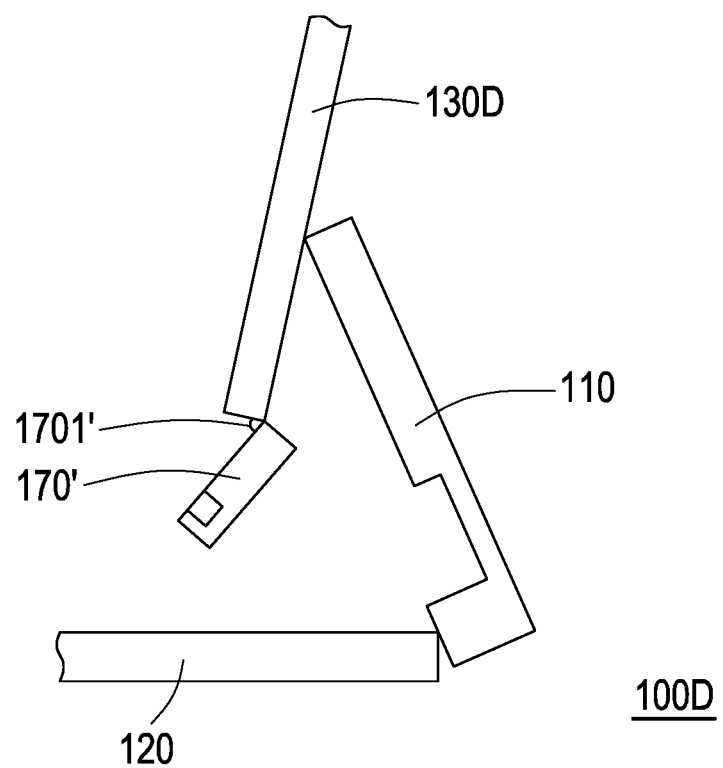

FIG. 15A to FIG. 15C are side schematic views of various states of an electronic device according to another embodiment of the disclosure. The main difference between the embodiment shown in FIG. 15A to FIG. 15C and the previous embodiment lies in the addition of elements at the lower end of the third body. The configuration and the manner of actuation of the remaining components are the same or similar to those of the previous embodiment, which are not repeated here. The same or similar components to the previous embodiment are denoted by the same or similar reference numerals. An electronic device 100D shown in FIG. 15A to FIG. 15C further includes an image capturing assembly 170', and the image capturing assembly 170' is movably disposed on the rear side of a third body 130D and is close to the bottom end of the third body 130D. Specifically, a rotating shaft 1701' of the image capturing assembly 170' is rotatably connected to the third body 130D. When the electronic device 100D is in the operation state shown in FIG. 15A to FIG. 15C, the image capturing assembly 170' is adapted to flip from the rear side of the third body 130D to the bottom of the third body 130D with the rotating shaft 1701' as the axis and protrude outwards as shown in FIG. 15A to FIG. 15B, and the image capturing assembly 170' is adapted to continue to flip with its rotating shaft 1701' as the axis as shown in FIG. 15B to FIG. 15C to adjust the capturing angle.

Referring to the embodiment shown in FIG. 1A to FIG. 1C again, the electronic device 100 may further include at least one speaker assembly 180. The speaker assembly 180 is disposed on the first body 110 and faces the third body 130. Thereby, the speaker assembly 180 transmits sound by facing towards the user, so as to provide a better sound output effect.

Figure 16A:
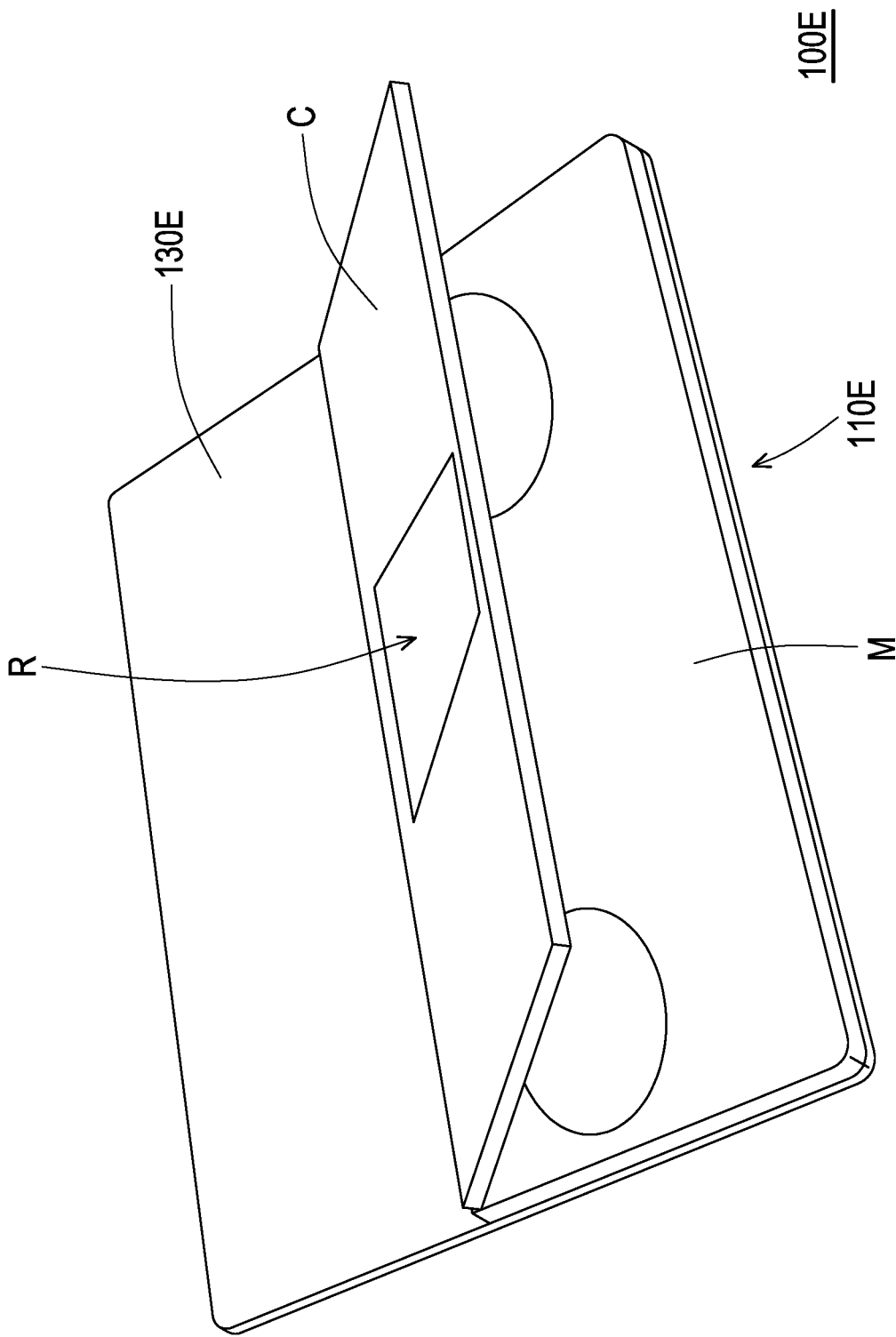
FIG. 16A is a three-dimensional view of an electronic device in a folded state according to another embodiment of the disclosure.
Figure 16B:
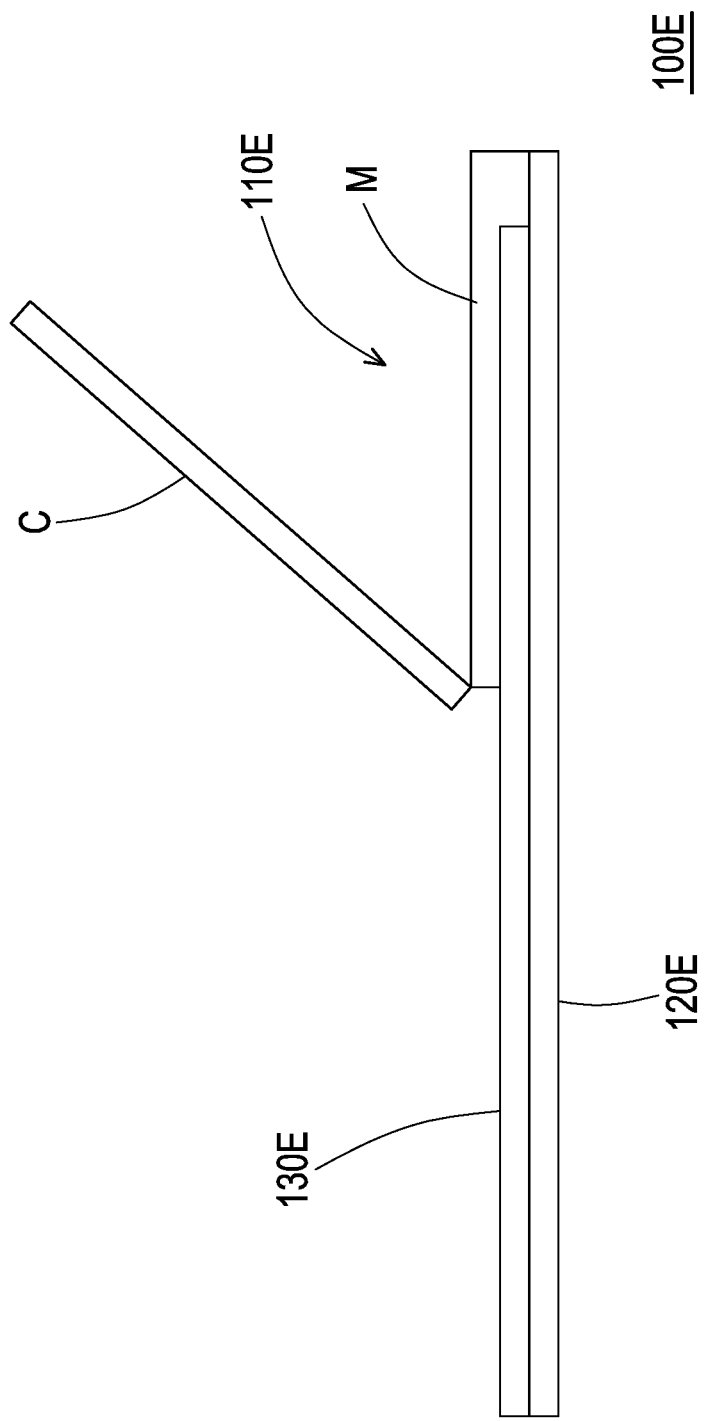
FIG. 16B is a side schematic view of the electronic device of FIG. 16A.

FIG. 16A is a three-dimensional view of an electronic device in a folded state according to another embodiment of the disclosure. FIG. 16B is a side schematic view of the electronic device of FIG. 16A. The main difference between the embodiment shown in FIG. 16A to FIG. 16B and the previous embodiment lies in the addition of a cover body on the first body. The configuration and the manner of actuation of the remaining components are the same or similar to those of the previous embodiment, which are not repeated here. The same or similar components to the previous embodiment are denoted by the same or similar reference numerals. In an electronic device 100E shown in FIG. 16A to FIG. 16B, a first body 110E includes a main body M and a cover body C, in which the cover body C detachably covers the inner space of the main body M. Specifically, the cover body C of the present embodiment is, for example, connected to the main body M in an openable and closeable manner. When the electronic device 100E is in the folded state shown in FIG. 16A and FIG. 16B, the cover body C is located on a lateral side of the electronic device 100E. Thereby, it is convenient for the user to open the cover body C to maintain, replace, or clean the components inside the main body M. Further, the cover body C of this embodiment has a transparent region R, and the transparent region R corresponds to the inner space of the main body M, so that the user may observe the components inside the main body M through the transparent region R. The transparent region R may be completely transparent or semi-transparent, which is not limited in the disclosure. In addition, a display layer may be disposed in the transparent region R so that a display function is included for displaying notification messages or performance information.

Figure 17A:
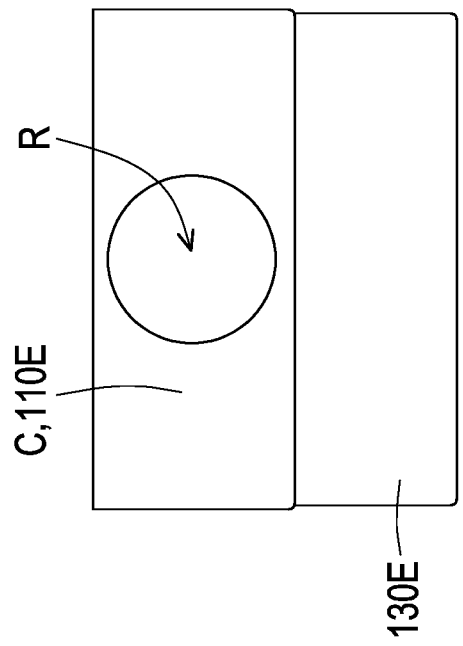
FIG. 17A is a top view of the cover body of FIG. 16A closed to the first body.
Figure 17B:
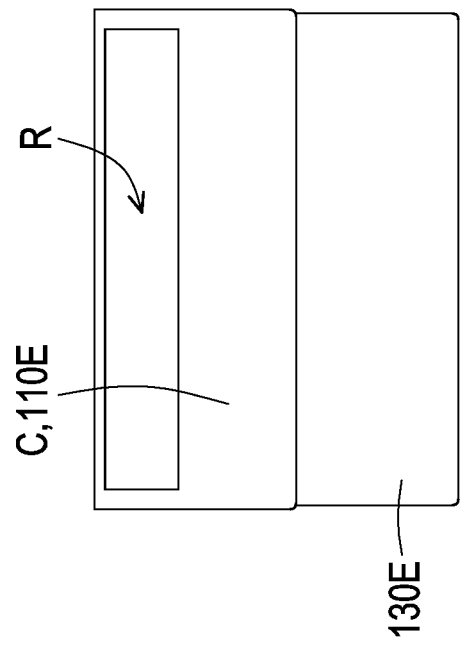
Figure 17C:
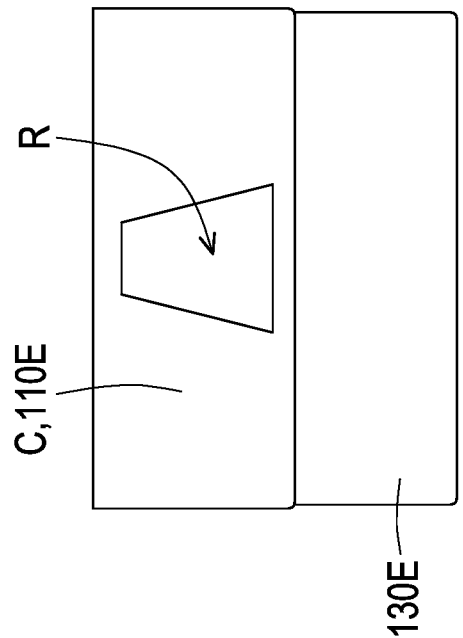
Figure 17D:
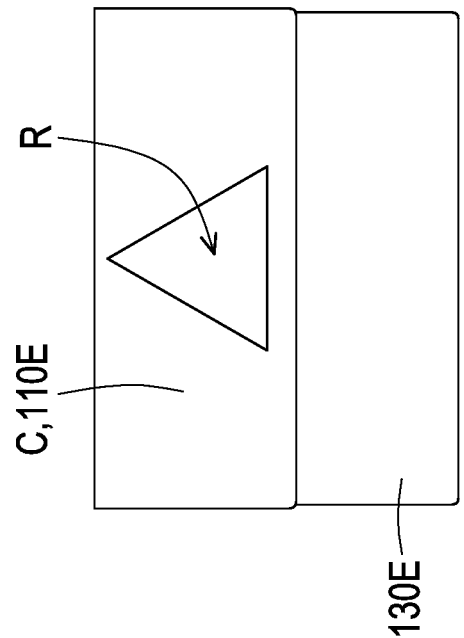
Figure 17E:
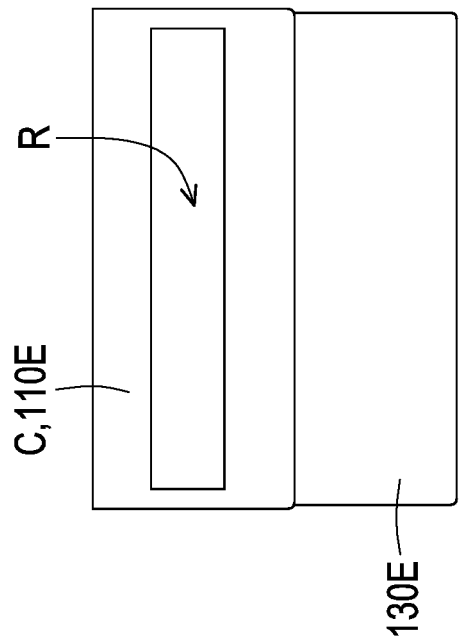
Figure 17F:
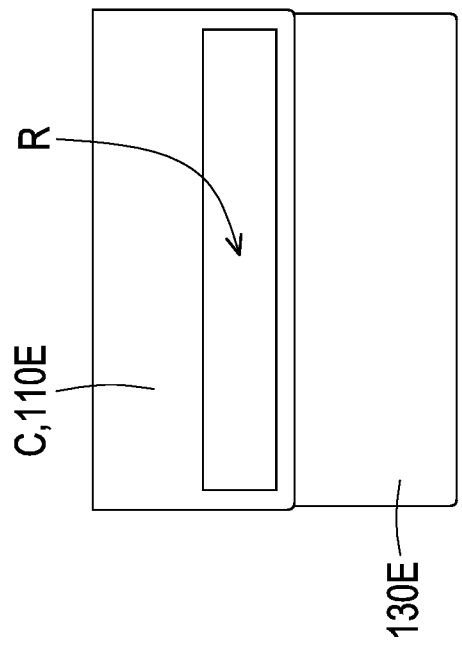
Figure 17G:
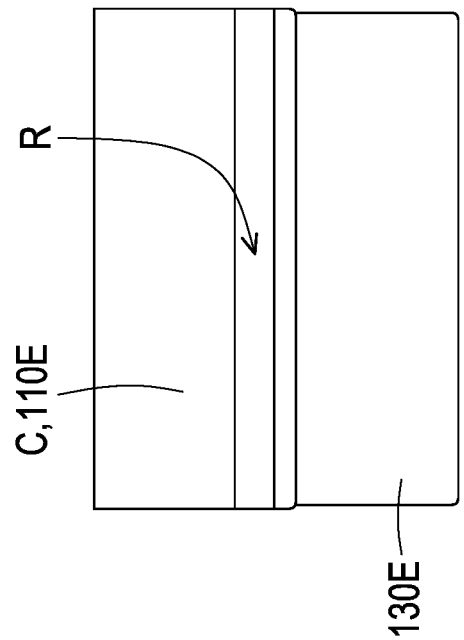
Figure 17H:
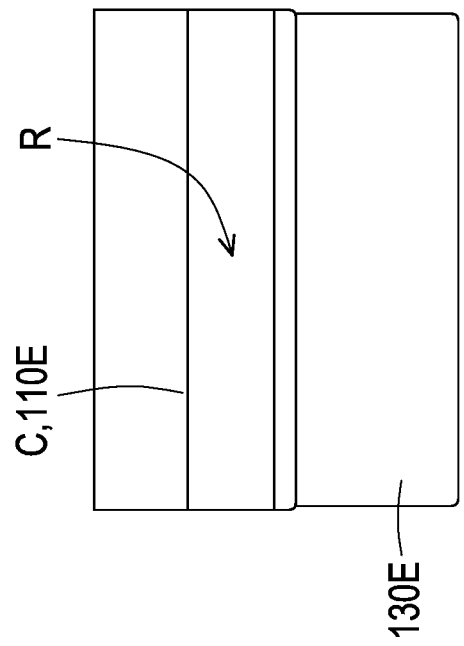

FIG. 17A is a top view of the cover body of FIG. 16A closed to the first body. FIG. 17B to FIG. 17I illustrate changes in the shape, size and position of the transparent region of FIG. 17A. The transparent region R may be not only a trapezoid as shown in FIG. 17A, but also a circle as shown in FIG. 17B, a triangle as shown in FIG. 17C, a rectangle as shown in FIG. 17D, or other shapes, which are not limited in the disclosure. In addition, the position of the transparent region R may be changed from closer to the rear end of the electronic device 100E as shown in FIG. 17D to slightly farther from the rear end of the electronic device 100E as shown in FIG. 17E, or may be changed to be even further away from the rear end of the electronic device 100E as shown in FIG. 17F, which is not limited in the disclosure. In addition, the transparent region R may be various sizes as shown in FIG. 17G to FIG. 17I, which is not limited in the disclosure.

FIG. 18 is a side schematic view of an electronic device according to another embodiment of the disclosure. The main difference between the embodiment shown in FIG. 18 and the previous embodiment is that the lower end of the third body has a light-emitting function. The configuration and the manner of actuation of the remaining components are the same or similar to those of the previous embodiment, which are not repeated here. The same or similar components to the previous embodiment are denoted by the same or similar reference numerals. In an electronic device 100F shown in FIG. 18, a light-emitting element may be added to the lower end of the back surface of a third body 130F, in which the light-emitting element has a light-emitting function for emitting various ambient lights L to provide users with experiences of different ambient and usage scenarios.

To sum up, in the electronic device of the disclosure, the third body is supported away from the second body by the first body in the operation state, so that the display region of the third body is not too close to the second body, thereby the user may experience the visual experience that the display screen of the third body exists independently in space. In addition, the heat-generating elements such as processors and graphic cards and the corresponding heat dissipation assemblies may be disposed on the first body with a large thickness. The first body is unfolded and is upright relative to the second body in the operation state, so that the heat dissipation air flows with a rather good flow efficiency on the front surface and the back surface of the first body, which improves its heat dissipation capacity. In addition, when using the electronic device, the user may be able to experience the sense of thinness and lightness of the electronic device through the thin thickness of the second body closest to the user. In addition, since the heat-generating element is not disposed on the second body, the battery assembly disposed on the second body does not heat up due to the influence of the heat-generating element, thereby the battery assembly may have a longer battery life.

What is claimed is:
1. An electronic device, comprising:
a first body, comprising a processing unit;
a second body, comprising an input unit and is pivoted to an end of the first body, wherein a thickness of the first body is greater than a thickness of the second body; and
a third body, comprising a display unit and is pivoted to another end of the first body, wherein when the third body is closed to the first body and the first body is closed to the second body, the electronic device is in a folded state,
when the first body is expanded from the second body with a first predetermined angle, the third body is adapted to be expanded from the first body with a second predetermined angle, such that the electronic device is in an operation state,
when the electronic device is in the operation state, the third body is supported away from the second body by the first body,
the electronic device further comprises a first pivot shaft, a second pivot shaft, and a locking structure, wherein the first body and the second body are pivotally connected to each other through the first pivot shaft, the first body and the third body are pivotally connected to each other through the second pivot shaft, and the locking structure is disposed on the first body and is adapted to lock the first pivot shaft or the second pivot shaft,
wherein the first pivot shaft has a first concave portion, the second pivot shaft has a second concave portion, the locking structure comprises a frame body and a locking member, and the locking member is slidably disposed on the frame body and has a first locking end and a second locking end opposite to each other,
when an expanded angle of the first body relative to the second body is less than the first predetermined angle, the first concave portion is misaligned with the first locking end, the second concave portion is aligned with the second locking end, and the second locking end is locked in the second concave portion,
when the expanded angle of the first body relative to the second body is the first predetermined angle, the first concave portion is aligned with the first locking end, the locking member is adapted to slide relative to the frame body to lock the first locking end in the first concave portion and move the second locking end away from the second concave portion.

2. The electronic device according to claim 1, wherein when an expanded angle of the first body relative to the second body is less than the first predetermined angle, an expanded angle of the third body relative to the first body is locked to 0 degrees.

3. The electronic device according to claim 1, wherein when the third body is expanded from the first body, an expanded angle of the first body relative to the second body is locked to the first predetermined angle.

4. The electronic device according to claim 1, wherein the first predetermined angle is less than or equal to 90 degrees.

5. The electronic device according to claim 1, wherein the first predetermined angle is greater than 45 degrees and less than 85 degrees.

6. The electronic device according to claim 1, wherein the second predetermined angle is less than or equal to 135 degrees.

7. The electronic device according to claim 1, wherein the second predetermined angle is greater than 50 degrees and less than 90 degrees.

8. The electronic device according to claim 1, wherein when an expanded angle of the third body relative to the first body is between 0 degrees and a third predetermined angle, there is a first torsion force between the third body and the first body, when the expanded angle of the third body relative to the first body is between the third predetermined angle and the second predetermined angle, there is a second torsion force between the third body and the first body, and the second torsion force is greater than the first torsion force.

9. The electronic device according to claim 1, further comprising an image capturing assembly, wherein the image capturing assembly is movably disposed on a rear side of the third body, when the electronic device is in the operation state, the image capturing assembly is adapted to protrude from the rear side of the third body to a bottom of the third body.

10. The electronic device according to claim 1, wherein the processing unit includes at least one heat-generating element and at least one heat dissipation assembly, the at least one heat-generating element and the at least one heat dissipation assembly are disposed on the first body.

11. The electronic device according to claim 1, further comprising at least one speaker assembly, wherein the at least one speaker assembly is disposed on the first body and faces the third body.

12. The electronic device according to claim 1, wherein the input unit comprises a keyboard assembly, the electronic device comprises at least one battery assembly, and the keyboard assembly and the at least one battery assembly are disposed on the second body.

13. The electronic device according to claim 1, wherein the first body includes a main body and a cover body, the cover body detachably covers an inner space of the main body, when the electronic device is in the folded state, the cover body is located on a lateral side of the electronic device.

14. The electronic device according to claim 13, wherein the cover body has a transparent region, and the transparent region corresponds to the inner space.

15. The electronic device according to claim 14, wherein the transparent region has a display function.

\* \* \* \* \*